US012771044B2

(12) United States Patent
Joung et al.

(10) Patent No.: US 12,771,044 B2
(45) Date of Patent: Oct. 20, 2026

(54) ANTENNA APPARATUS AND IMAGE DISPLAY APPARATUS INCLUDING THE SAME

(71) Applicant: LG ELECTRONICS INC., Seoul (KR)

(72) Inventors: Jeayoul Joung, Seoul (KR); Ilnam Cho, Seoul (KR); Dongjoo You, Seoul (KR); Seongmoon Cho, Seoul (KR); Byeongyong Park, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 18/578,545

(22) PCT Filed: Jul. 12, 2021

(86) PCT No.: PCT/KR2021/008911

§ 371 (c)(1),
(2) Date: Jan. 17, 2024

(87) PCT Pub. No.: WO2023/286883

PCT Pub. Date: Jan. 19, 2023

(65) Prior Publication Data

US 2024/0347926 A1 Oct. 17, 2024

(51) Int. Cl.

*H01Q 21/00* (2006.01)
*B32B 7/12* (2006.01)
(Continued)

(52) U.S. Cl.

CPC ........... *H01Q 21/0006* (2013.01); *B32B 7/12* (2013.01); *B32B 27/08* (2013.01); *B32B 27/281* (2013.01);
(Continued)

(58) Field of Classification Search

CPC ........... B32B 7/023; B32B 7/12; B32B 15/02; B32B 15/08; B32B 15/082; B32B 15/085;
(Continued)

(56) References Cited

U.S. PATENT DOCUMENTS

2021/0141426 A1* 5/2021 Kim ......................... H01Q 1/46
2022/0269319 A1* 8/2022 Lee ......................... G06F 1/1698
2023/0247121 A1* 8/2023 Yun ......................... H01Q 1/243 455/566

FOREIGN PATENT DOCUMENTS

CN 102347527 A 2/2012
KR 10-1025054 B1 3/2011
(Continued)

OTHER PUBLICATIONS

Machine Translation KR20210064531A (Year: 2021).*

*Primary Examiner* — Raymond R Chai

(74) *Attorney, Agent, or Firm* — Birch, Stewart, Kolasch & Birch, LLP

(57) ABSTRACT

An antenna apparatus and an image display apparatus including the same are disclosed. An antenna apparatus according to an embodiment of the present disclosure comprises a substrate, a metal mesh disposed on a portion of an upper portion of the substrate, and a protective layer disposed on the metal mesh, wherein the protective layer and the substrate are more transparent than the metal mesh. Accordingly, breakage of a metal mesh inside a transparent antenna apparatus may be reduced.

19 Claims, 18 Drawing Sheets

(51) Int. Cl.

| | |
|---|---|
| ***B32B 27/08*** | (2006.01) |
| ***B32B 27/28*** | (2006.01) |
| ***B32B 27/32*** | (2006.01) |
| ***B32B 27/36*** | (2006.01) |
| ***H01Q 1/22*** | (2006.01) |
| ***H01Q 21/28*** | (2006.01) |

(52) U.S. Cl.

CPC ............ *B32B 27/325* (2013.01); *B32B 27/36* (2013.01); *H01Q 1/2283* (2013.01); *H01Q 21/28* (2013.01); *B32B 2255/10* (2013.01); *B32B 2255/205* (2013.01); *B32B 2307/41* (2013.01); *B32B 2307/412* (2013.01); *B32B 2307/546* (2013.01); *B32B 2307/7376* (2023.05); *B32B 2457/20* (2013.01)

(58) Field of Classification Search

CPC ..... B32B 15/09; B32B 23/042; B32B 27/302; B32B 27/308; B32B 27/325; B32B 27/36; B32B 27/365; B32B 2255/10; B32B 2255/205; B32B 2307/412; B32B 2307/546; B32B 2307/3736; B32B 2457/00; B32B 2457/20; C08J 5/18; C09J 9/00; H01Q 1/085; H01Q 1/1271; H01Q 1/2283; H01Q 1/243; H01Q 1/38; H01Q 9/40; H01Q 21/0006; H01Q 21/28

See application file for complete search history.

(56) References Cited

FOREIGN PATENT DOCUMENTS

| | | | | | |
|---|---|---|---|---|---|
| KR | 10-2019-0071411 | A | | 6/2019 | |
| KR | 102041690 | B1 | * | 11/2019 | ........... H01Q 9/0407 |
| KR | 10-2020-0010906 | A | | 1/2020 | |
| KR | 10-2020-0144076 | A | | 12/2020 | |
| KR | 10-2204404 | B1 | | 1/2021 | |
| KR | 10-2021-0050452 | A | | 5/2021 | |
| KR | 10-2021-0064531 | A | | 6/2021 | |
| KR | 10-2021-0079174 | A | | 6/2021 | |
| KR | 20210064531 | A | * | 6/2021 | ........... H01Q 9/0485 |
| WO | WO 2021/033807 | A1 | | 2/2021 | |

* cited by examiner (a)

(b)

ANTENNA APPARATUS AND IMAGE DISPLAY APPARATUS INCLUDING THE SAME

CROSS REFERENCE TO RELATED APPLICATION

This application is the National Phase of PCT International Application No. PCT/KR2021/008911, filed on Jul. 12, 2021, which is hereby expressly incorporated by reference into the present application.

BACKGROUND

1. Field

The present disclosure relates to an antenna apparatus and an image display apparatus including the antenna apparatus and more particularly, to a transparent antenna apparatus capable of reducing breakage of a metal mesh within the transparent antenna apparatus and an image display apparatus including the transparent antenna apparatus.

2. Description of the Related Art

An antenna apparatus is an apparatus used for receiving a signal wirelessly or transmitting a signal wirelessly.

An antenna apparatus is employed for various electronic devices for transmission or reception of a wireless signal.

Meanwhile, with the tendencies of enlargement and luxurious qualities of the image display apparatus, a display of the image display apparatus and a wireless transmission apparatus supplying a video signal to the display are provided spaced to be apart from each other.

Accordingly, an antenna apparatus is used for wireless transmission of video data between a display and a wireless transmission apparatus.

Meanwhile, Korean patent publication No. 10-2018-0099046 (hereinafter, referred to as 'prior literature') discloses a transparent film antenna.

However, according to the prior literature, since metal electrodes for the antenna are disposed on the insulating film, a disadvantageous effect occurs in that the antenna's metal electrodes may be disconnected when subjected to bending.

SUMMARY

The present disclosure has been made in view of the above problems, and an aspect of the present disclosure is to provide a transparent antenna apparatus capable of reducing breakage of a metal mesh and an image display apparatus including the same.

Another aspect of the present disclosure is to provide a flexible transparent antenna apparatus and an image display apparatus including the same.

In an aspect of the present disclosure, the object disclosed above and other objects may be accomplished by the provision of an antenna apparatus. The antenna apparatus comprises a substrate, a metal mesh disposed on a portion of an upper portion of the substrate, and a protective layer disposed on the metal mesh, wherein the protective layer and the substrate are more transparent than the metal mesh.

Meanwhile, an opaque metal electrode may be formed in a first area of an upper portion of the substrate, the metal mesh may be formed in a second area of an upper portion of the substrate, and the protective layer may be formed on a portion of the first area and an upper portion of the second area.

Meanwhile, the width of the opaque metal electrode and the width of the metal mesh may be the same, and a signal feed line having a width narrower than the width of the opaque metal electrode may be connected to one end of the opaque metal electrode.

Meanwhile, an opaque metal electrode may be formed in a first area of an upper portion of the substrate, a first metal mesh having a first width may be formed in a second area of an upper portion of the substrate, a second metal mesh having a second width narrower than the first width may be formed on a third area of an upper portion of the substrate, and the protective layer may be formed on a portion of the first area, the second area, and an upper portion of the third area.

Meanwhile, the width of the opaque metal electrode and the width of the first metal mesh may be the same, and a signal feed line having a width narrower than the width of the opaque metal electrode may be connected to one end of the opaque metal electrode.

Meanwhile, the protective layer may include an adhesive layer and a flexible polymer film disposed on the adhesive layer.

Meanwhile, the flexible polymer film may include at least one of ester film, polyester resin, polyolefin resin, acrylic resin, styrene resin, cellulose resin, triacetyl cellulose, imide resin, or polycarbonate resin.

Meanwhile, the adhesive layer may include at least one of Optically Clear Adhesive (OCA) or Optically Clear Resin (OCR).

Meanwhile, the protective layer may include flexible polymer resin.

Meanwhile, the flexible polymer resin may include at least one of polyester resin, polyolefin resin, acrylic resin, styrene resin, cellulose resin, triacetyl cellulose, imide resin, polycarbonate resin, curing initiator, or viscosity modifier.

Meanwhile, the protective layer may include an optically clear adhesive (OCA) and a polyethlene terephthalate (PET) film disposed on the optically clear adhesive, the thickness of the optically clear adhesive may range from 15 to 50 μm, and the thickness of the polyester film may range from 12 to 25 μm.

Meanwhile, the substrate may include at least one of PET film, Cyclo Olefin Polymer, or colorless polyimide.

Meanwhile, the metal mesh may include copper.

Meanwhile, the substrate may be a transparent flexible substrate.

Meanwhile, it is desirable for the protective layer to have a lower dielectric constant and lower dielectric loss than the substrate.

Meanwhile, an antenna apparatus according to an embodiment of the present disclosure may further comprise a flexible printed circuit board, a joining member, of which one end is connected to one end of the flexible printed circuit board, and an opaque metal electrode, of which one end is connected to the other end of the joining member, wherein a portion of the metal mesh may be connected to the other end of the opaque metal electrode.

Meanwhile, an image display apparatus according to an embodiment of the present disclosure comprises a display and a wireless transmission device separated from the display and configured to transmit video data to the display through a wireless communication scheme, wherein at least one antenna apparatus is disposed on one surface of the display, and the at least one antenna apparatus comprises a substrate, a metal mesh disposed on a portion of an upper portion of the substrate, and a protective layer disposed on the metal mesh, wherein the protective layer and the substrate are more transparent than the metal mesh.

Effects of the Disclosure

An antenna apparatus according to an embodiment of the present disclosure comprises a substrate, a metal mesh disposed on a portion of an upper portion of the substrate, and a protective layer disposed on the metal mesh, wherein the protective layer and the substrate are more transparent than the metal mesh. Accordingly, breakage of a metal mesh inside a transparent antenna apparatus may be reduced. In particular, in another aspect of the present disclosure, breakage of a metal mesh within a flexible transparent antenna apparatus may be reduced.

Meanwhile, an opaque metal electrode may be formed in a first area of an upper portion of the substrate, the metal mesh may be formed in a second area of an upper portion of the substrate, and the protective layer may be formed on a portion of the first area and an upper portion of the second area. Accordingly, breakage of a metal mesh inside a transparent antenna apparatus may be reduced.

Meanwhile, the width of the opaque metal electrode and the width of the metal mesh may be the same, and a signal feed line having a width narrower than the width of the opaque metal electrode may be connected to one end of the opaque metal electrode. Accordingly, a signal received from the antenna apparatus may be transmitted, or a signal may be transmitted to the antenna apparatus.

Meanwhile, an opaque metal electrode may be formed in a first area of an upper portion of the substrate, a first metal mesh having a first width may be formed in a second area of an upper portion of the substrate, a second metal mesh having a second width narrower than the first width may be formed on a third area of an upper portion of the substrate, and the protective layer may be formed on a portion of the first area, the second area, and an upper portion of the third area. Accordingly, breakage of a metal mesh inside a transparent antenna apparatus may be reduced.

Meanwhile, the width of the opaque metal electrode and the width of the first metal mesh may be the same, and a signal feed line having a width narrower than the width of the opaque metal electrode may be connected to one end of the opaque metal electrode. Accordingly, a signal received from the antenna apparatus may be transmitted, or a signal may be transmitted to the antenna apparatus.

Meanwhile, the protective layer may include an adhesive layer and a flexible polymer film disposed on the adhesive layer. Accordingly, breakage of a metal mesh inside a transparent antenna apparatus may be reduced.

Meanwhile, the flexible polymer film may include at least one of ester film, polyester resin, polyolefin resin, acrylic resin, styrene resin, cellulose resin, triacetyl cellulose, imide resin, or polycarbonate resin. Accordingly, breakage of a metal mesh inside a transparent antenna apparatus may be reduced.

Meanwhile, the adhesive layer may include at least one of Optically Clear Adhesive (OCA) or Optically Clear Resin (OCR) Accordingly, breakage of a metal mesh inside a transparent antenna apparatus may be reduced.

Meanwhile, the protective layer may include flexible polymer resin. Accordingly, breakage of a metal mesh inside a transparent antenna apparatus may be reduced.

Meanwhile, the flexible polymer resin may include at least one of polyester resin, polyolefin resin, acrylic resin, styrene resin, cellulose resin, triacetyl cellulose, imide resin, polycarbonate resin, curing initiator, or viscosity modifier. Accordingly, breakage of a metal mesh inside a transparent antenna apparatus may be reduced.

Meanwhile, the protective layer may include an optically clear adhesive (OCA) and a polyethlene terephthalate (PET) film disposed on the optically clear adhesive, the thickness of the optically clear adhesive may range from 15 to 50 μm, and the thickness of the polyester film may range from 12 to 25 μm. Accordingly, breakage of a metal mesh inside a transparent antenna apparatus may be reduced.

Meanwhile, the substrate may include at least one of PET film, Cyclo Olefin Polymer, or colorless polyimide. Accordingly, breakage of a metal mesh inside a transparent antenna apparatus may be reduced.

Meanwhile, the metal mesh may include copper. Accordingly, a metal mesh having excellent electrical conductivity may be implemented.

Meanwhile, the substrate may be a transparent flexible substrate. Accordingly, breakage of a metal mesh inside a flexible transparent antenna apparatus may be reduced.

Meanwhile, it is desirable for the protective layer to have a lower dielectric constant and lower dielectric loss than the substrate. Accordingly, breakage of a metal mesh inside a transparent antenna apparatus may be reduced.

Meanwhile, an antenna apparatus according to an embodiment of the present disclosure may further comprise a flexible printed circuit board, a joining member, of which one end is connected to one end of the flexible printed circuit board, and an opaque metal electrode, of which one end is connected to the other end of the joining member, wherein a portion of the metal mesh may be connected to the other end of the opaque metal electrode. Accordingly, breakage of a metal mesh inside a transparent antenna apparatus may be reduced.

Meanwhile, an image display apparatus according to an embodiment of the present disclosure comprises a display and a wireless transmission device separated from the display and configured to transmit video data to the display through a wireless communication scheme, wherein at least one antenna apparatus is disposed on one surface of the display, and the at least one antenna apparatus comprises a substrate, a metal mesh disposed on a portion of an upper portion of the substrate, and a protective layer disposed on the metal mesh, wherein the protective layer and the substrate are more transparent than the metal mesh. Accordingly, breakage of a metal mesh inside a transparent antenna apparatus may be reduced. In particular, in another aspect of the present disclosure, breakage of a metal mesh inside a flexible transparent antenna apparatus may be reduced.

DETAILED DESCRIPTION OF THE PREFERRED EMBODIMENTS

Embodiments of the present disclosure will be described below in detail with reference to the attached drawings.

The terms 'module' and 'unit' used to signify components are used herein to help the understanding of the components and thus they should not be considered as having specific meanings or roles. Accordingly, the terms 'module' and 'unit' may be used interchangeably.

Figure 1:
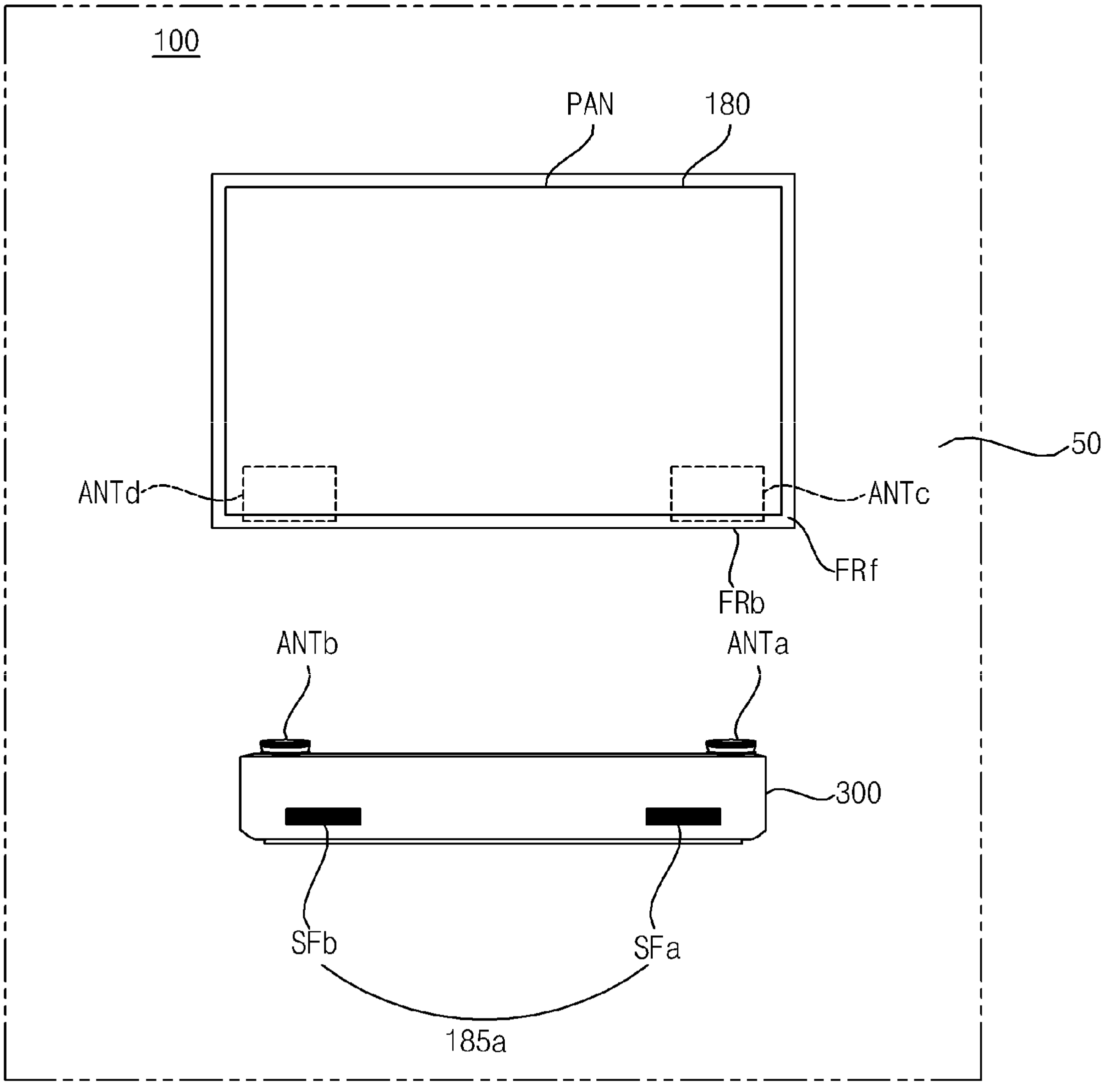
FIG. 1 is a view illustrating an image display apparatus according to an embodiment of the present disclosure.

FIG. 1 is a view illustrating an image display apparatus according to an embodiment of the present disclosure.

Referring to FIG. 1, an image display apparatus 100 according to an embodiment of the present disclosure may include a display 180 and a wireless transmission apparatus 300.

The display 180 may include a panel PAN for displaying an image. To this end, as the panel PAN, various examples including a liquid crystal display panel, an organic light emitting panel, an inorganic light emitting panel, etc. are available.

The wireless transmission apparatus 300 may be spaced apart from the display 180, and transmit a control signal by a first wireless communication scheme, and transmit image data by a second wireless communication scheme.

Here, the first wireless communication scheme may be a wireless communication scheme such as WiFi, Bluetooth, etc. For example, a frequency of several GHZ may be used. More specifically, for example, a frequency between approximately 2 G to 6 GHz may be used.

Meanwhile, the second wireless communication scheme may use a higher frequency than the first wireless communication scheme, and may be a wireless communication scheme such as WiDi, WiHD, etc. For example, a frequency of dozens of GHZ may be used. More specifically, for example, a frequency of approximately 50 GHz may be used.

Meanwhile, the wireless transmission apparatus 300 transmits the image data, so the wireless transmission apparatus 300 may also be called an AV box.

Meanwhile, the wireless transmission apparatus 300 according to an embodiment of the present disclosure may include at least one antenna apparatus ANTa, ANTb for wireless communication with the display 180.

The antenna apparatus ANTa, ANTb mounted within the wireless transmission apparatus 300 may be rotated or translated for stable wireless signal transmission.

Meanwhile, in response to the antenna apparatus ANTa, ANTb mounted in the wireless transmission apparatus 300, the display 180 may include at least one antenna apparatus ANTc, ANTd disposed on one surface of the display 180.

For example, at least one antenna apparatus ANTc, ANTd may be a transparent antenna apparatus that may be attached to the panel PAN of the display 180.

Meanwhile, as shown in the figure, it is also possible that some areas (transparent areas) of at least one antenna apparatus ANTc, ANTd are disposed on the panel PAN, and other areas (opaque areas) are attached to the front frame FRf around the panel PAN.

Accordingly, in consideration of the current trend favoring a slim design for the front frame FRf, it becomes possible to implement transparent antenna apparatus ANTc, ANTd.

Some areas (transparent areas) of at least one antenna apparatus ANTc, ANTd may be disposed on the panel PAN, and other areas (opaque areas), when attached to the front frame FRf around the panel PAN, may undergo bending due to a gap between the panel PAN and the front frame FRf.

Meanwhile, different from FIG. 1, it is possible that some areas (transparent areas) of at least one antenna apparatus ANTc, ANTd are disposed on the front frame FRf around the panel PAN, and other areas (opaque areas) are attached to the rear frame FRb in a lower portion of the panel PAN.

Some areas (transparent areas) of at least one antenna apparatus ANTc, ANTd may be disposed on the front frame FRf around the panel PAN, and other areas (opaque areas), when attached to the rear frame FRb below the panel PAN, may undergo bending due to a gap between the front frame FRf and the rear frame FRb.

Accordingly, the present disclosure proposes an antenna apparatus ANT capable of reducing the amount of internal metal electrodes even when bending occurs in a portion of at least one antenna apparatus ANTc, ANTd.

To this end, the antenna device ANT according to an embodiment of the present disclosure comprises a substrate (SP in FIG. 7), a metal mesh (MM in FIG. 7) disposed on a portion (ARm2 in FIG. 8) of an upper portion of the substrate SP, and a protective layer (ET in FIG. 7) disposed on the metal mesh MM. At this time, it is preferable that the protective layer ET and the substrate SP are more transparent than the metal mesh MM.

Accordingly, it becomes possible to reduce breakage of the metal mesh MM in the transparent antenna apparatus ANT. In particular, it is possible to reduce breakage of the metal mesh MM within a flexible transparent antenna apparatus ANT.

Meanwhile, the wireless transmission apparatus 300 may perform audio signal processing, and output a sound synchronized with the image displayed in the display 180.

For example, the wireless transmission apparatus 300 may include a speaker device 185*a* that may output the sound in a front direction.

Meanwhile, speakers SFa, SFb belonging to the speaker unit 185*a* may be disposed in the front direction of the wireless transmission apparatus 300.

Accordingly, the sound produced by the speaker unit 185 is directed toward a user and reaches the user.

Figure 2:
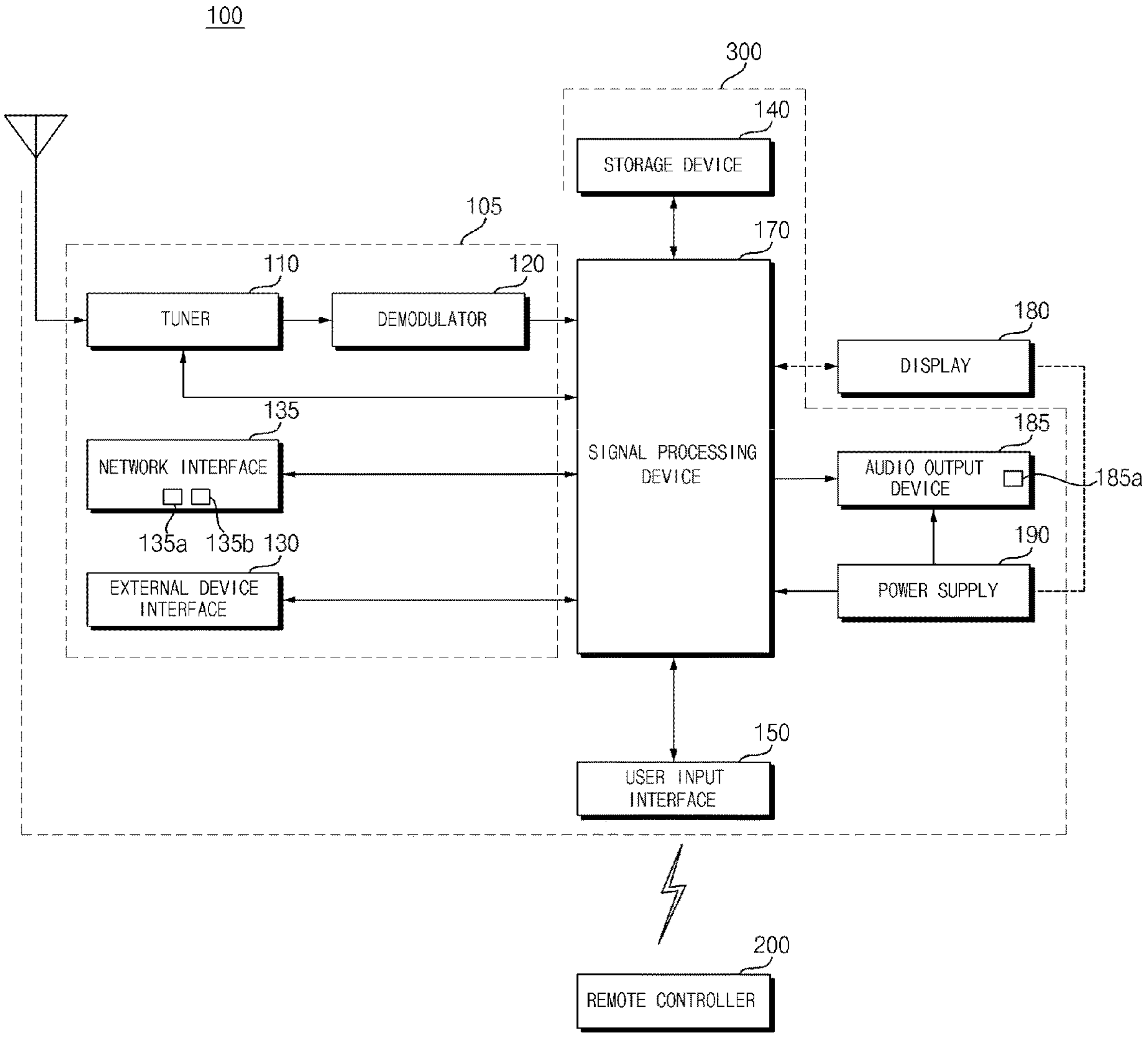
FIG. 2 is a block diagram illustrating the image display apparatus illustrated in FIG. 1.

FIG. 2 is a block diagram illustrating the image display apparatus illustrated in FIG. 1

Referring to FIG. 2, an image display apparatus 100 according to an embodiment of the present disclosure may include an image reception device 105, a memory 140, a user input interface 150, a sensor device (not illustrated), a signal processing device 170, a display 180, and an audio output device 185.

The image reception device 105 may include a tuner device 110, a demodulator 120, an external device interface 130, and a network interface 135. Of course, as necessary, it is also possible to design the image reception device 105 not to include the network interface 135 while including the tuner device 110 and the demodulator 120, and conversely, it is also possible to design the image reception device 105 not to include the tuner device 110 and the demodulator 120 while including the network interface 135.

The tuner 110 selects a Radio Frequency (RF) broadcast signal corresponding to a channel selected by a user or an RF broadcast signal corresponding to each of pre-stored channels from among a plurality of RF broadcast signals received through an antenna, and downconverts the selected RF broadcast signal into an Intermediate Frequency (IF) signal or a baseband Audio/Video (A/V) signal.

The tuner 110 may sequentially select a number of RF broadcast signals corresponding to all broadcast channels previously stored in the image display apparatus 100 by a channel add function from among a plurality of RF signals received through the antenna, and may downconvert the selected RF broadcast signals into IF signals or baseband A/V signals.

The tuner 110 may include a plurality of tuners for receiving broadcast signals of a plurality of channels, or a single tuner for simultaneously receiving broadcast signals of a plurality of channels.

The demodulator 120 receives the digital IF signal from the tuner 110 and demodulates the digital IF signal.

The demodulator 120 may perform demodulation and channel decoding on the digital IF signal, thereby obtaining a stream signal TS. The stream signal TS may be a signal in which a video signal, an audio signal and/or a data signal are multiplexed.

The stream signal may be input to the signal processing device 170 and then subjected to demultiplexing and A/V signal processing. The signal processing device 170 outputs the processed video and audio signals to the display 180 and the audio output device 185, respectively.

The external device interface 130 may transmit or receive data to and from a connected external device (not illustrated). To this end, the external device interface 130 may include an A/V input/output device (not illustrated) or a wireless transceiver (not illustrated).

The external device interface 130 may be connected to an external device, wirelessly or wiredly, such as a Digital Versatile Disk (DVD) player, a Blu-ray Disk (BD) player, a game console, a camera, a camcorder, a computer (e.g. a laptop computer), or a set-top box. Then, the external device interface 130 may transmit and receive signals to and from the external device.

The A/V I/O device may receive audio and video signals from an external device, and the wireless transceiver may conduct short-range wireless communication with another electronic device.

The network interface 135 serves as an interface between the image display apparatus 100 and a wired/wireless network such as the Internet. For example, the network interface 135 may receive content or data from the Internet or from a Content Provider (CP) or a Network Provider (NP) over a network.

For example, the network interface 135 may include a first transceiver 135*a* and a second transceiver 135*b* for wirelessly transmitting data to the spaced display 180.

The memory 140 may store programs necessary for the signal processing device 170 to process signals and control, and may also store a processed audio, video, or data signal.

The memory 140 may also temporarily store an audio, video or data signal received from the external device interface 130. The memory 140 may store information about broadcast channels by the channel-add function.

While the memory 140 is shown in FIG. 2 as configured separately from the signal processing device 170, to which the present disclosure is not limited, the memory 140 may be incorporated into the signal processing device 170.

The user input interface 150 transmits a signal received from the user to the signal processing device 170 or transmits a signal received from the signal processing device 170 to the user.

For example, the user input interface 150 may receive user input signals such as a power-on/off signal, a channel selection signal, and a screen setting signal from the remote controller 200, provide the signal processing device 170 with user input signals received from local keys (not shown), such as inputs of a power key, a channel key, a volume key, and a setting value, transmit a user input signal received from the sensor device (not shown) that senses a user gesture to the signal processing device 170, or transmit a signal received from the signal processing device 170 to the sensor device.

The signal processing device 170 may demultiplex a stream signal received from the tuner 110, the demodulator 120, or the external device interface 130 into a number of signals, and process the demultiplexed signals into audio and video signals.

An image signal image-processed by the signal processing device 170 may be inputted into the display 180, and displayed as an image corresponding to the image signal. Further, the image signal image-processed by the signal processing device 170 may be outputted to the outside through the external device interface 130 or the network interface 135.

A voice signal processed by the signal processing device 170 may be sound-outputted to the audio output device 185. Further, the voice signal image-processed by the signal processing device 170 may be outputted to the outside through the external device interface 130 or the network interface 135.

While not shown in FIG. 2, the signal processing device 170 may include a demultiplexer and a video processor, which will be described later with reference to FIG. 3.

In addition, the signal processing device 170 may provide overall control to the image display apparatus 100. For example, the signal processing device 170 may control the tuner 110 to select an RF broadcast signal corresponding to a user-selected channel or a pre-stored channel.

The signal processing device 170 may control the image display apparatus 100 according to a user command received through the user input interface 150 or according to an internal program.

The signal processing device 170 may control the display 180 to display an image. The image displayed on the display 180 may be a Two-Dimensional (2D) or Three-Dimensional (3D) still image or video.

The signal processing device 170 may locate the user based on an image captured by a camera device (not shown). For example, the signal processing device 170 may determine the distance (a z-axis coordinate) between the user and the image display apparatus 100. In addition, the signal processing device 170 may determine x-axis and y-axis coordinates corresponding to the position of the user on the display 180.

The display 180 generates drive signals by converting a processed video signal, a processed data signal, an On Screen Display (OSD) signal, and a control signal received from the signal processing device 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 may also be a 3D display.

The display 180 may also be a touch screen that can be used not only as an output device but also as an input device.

The audio output device 185 may receive a processed audio signal from the signal processing device 170 and output the received audio signal as voice.

Meanwhile, the audio output device 185 may include the first speaker device 185*a* and the second speaker device (not illustrated). In this case, the second speaker device (not illustrated) may include an array speaker including a plurality of speakers.

A camera device (not shown) captures a user. The camera device may include, but not limited to, a single camera. When needed, the camera device may include a plurality of cameras. The camera device may be embedded on the display 180 in the image display apparatus 100, or may be separately configured. Image information captured by the camera device may be provided to the signal processing device 170.

The signal processing device 170 may sense a user's gesture from a captured image received from the camera device or from signals received from the sensor device (not shown) alone or in combination.

The power supply 190 supplies power across the whole image display apparatus 100. Particularly, the power supply 190 may supply power to the signal processing device 170 which may be implemented as a System On Chip (SOC), the display 180 for displaying an image, and the audio output device 185 for outputting an audio signal.

Specifically, the power supply 190 may include a converter to convert Alternating Current (AC) power to Direct Current (DC) power, and a DC/DC converter to convert the level of DC power.

The remote controller 200 transmits a user input to the user input interface 150. For the transmission of a user input, the remote controller 200 may operate based on various communication standards such as Bluetooth, RF communication, IR communication, Ultra WideBand (UWB), and ZigBee. In addition, the remote controller 200 may receive a video signal, an audio signal and/or a data signal from the user input interface 150 and may output the received signal as an image or sound.

The above-described image display apparatus 100 may be a fixed or mobile digital broadcast receiver.

The block diagram of the image display apparatus 100 illustrated in FIG. 2 is an exemplary embodiment of the present disclosure. The image display apparatus 100 is shown in FIG. 2 as having a number of components in a given configuration. However, the image display apparatus 100 may include fewer components or more components than those shown in FIG. 2. Also, two or more components of the image display apparatus 100 may be combined into a single component or a single component thereof may be separated into two more components. The functions of the components of the image display apparatus 100 as set forth herein are illustrative in nature and may be modified, for example, to meet the requirements of a given application.

Figure 3:
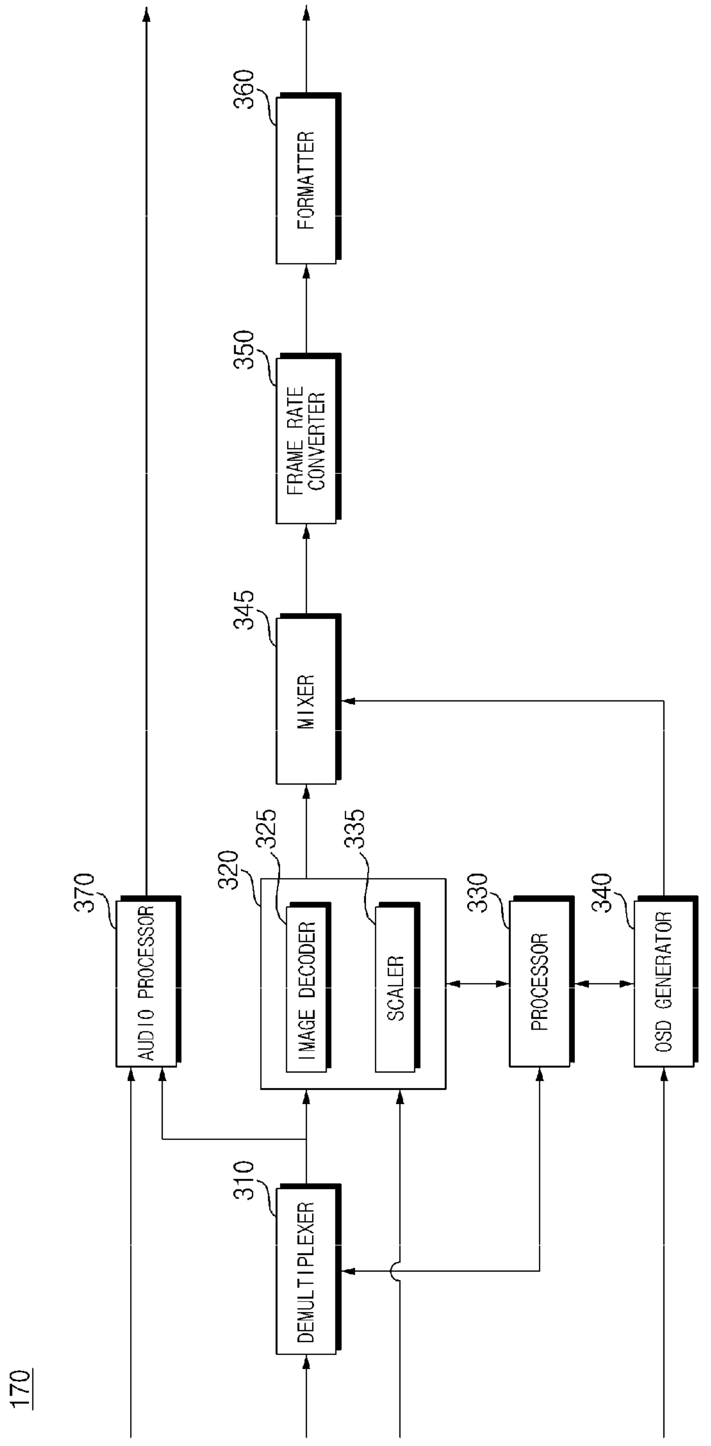
FIG. 3 is a block diagram illustrating a signal processing device illustrated in FIG. 2.

FIG. 3 is a block diagram illustrating a signal processing device illustrated in FIG. 2

Referring to FIG. 3, the signal processing device 170 may include a demultiplexor 310, a video processor 320, a processor 330, an OSD generator 340, a mixer 345, a Frame Rate Converter (FRC) 350, and a formatter 360 according to an embodiment of the present invention. The signal processing device 170 may further include an audio processor 370 and a data processor (not shown).

The demultiplexor 310 demultiplexes an input stream. For example, the demultiplexor 310 may demultiplex an MPEG-2 TS into a video signal, an audio signal, and a data signal. The input stream signal may be received from the tuner 110, the demodulator 120, or the external device interface 130.

The video processor 320 may process the demultiplexed video signal. For video signal processing, the video processor 320 may include an image decoder 325 and a scaler 335.

The image decoder 325 decodes the demultiplexed video signal and the scaler 335 scales the resolution of the decoded video signal so that the video signal may be displayed on the display 180.

The image decoder 325 may be provided with decoders that operate in conformance to various standards.

The processor 330 may provide overall control to the image display apparatus 100 or the signal processing device 170. For example, the processor 330 may control the tuner 110 to tune to an RF broadcasting corresponding to a user-selected channel or a pre-stored channel.

The processor 330 may also control the image display apparatus 100 according to a user command received through the user input interface 150 or an internal program.

The processor 330 may control data transmission through the network interface 135 or the external device interface 130.

The processor 330 may control operations of the demultiplexor 310, the video processor 320, and the OSD generator 340 in the signal processing device 170.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a User Interface (UI), a variety of menus, widgets, and icons.

Further, the OSD generator 340 may generate a pointer to be displayed on the display 180 based on a pointing signal received from the remote controller 200. Especially, the pointer may be generated from a pointing signal processor (not shown), which may reside in the OSD generator 340. Obviously, the pointing signal processor may be configured separately from the OSD generator 240.

The mixer 345 may mix the decoded video signal processed by the video processor 320 with the OSD signal generated from the OSD generator 340.

The FRC 350 may change the frame rate of an input video signal or simply output the video signal without frame rate conversion.

The formatter 360 may convert a received signal to a video signal to be provided to the display 180. For example, the formatter 360 may convert the received signal into a Low Voltage Differential Signal (LVDS) or mini-LVDS.

The audio processor 370 of the signal processing device 170 may process the demultiplexed audio signal, or an audio signal of specific content. For the audio signal processing, the audio processor 370 may have a plurality of decoders.

The audio processor 370 of the signal processing device 170 may also adjust the bass, treble, and volume of the audio signal.

The data processor (not shown) of the signal processing device 170 may process the data signal obtained by demultiplexing the input stream signal. For example, if the demultiplexed data signal is a coded data signal, the data processor may decode the coded data signal. The coded data signal may be an EPG which includes broadcasting information specifying the start time, end time, and the like of a scheduled broadcast program of each channel.

The block diagram of the signal processing device 170 illustrated in FIG. 3 is purely exemplary. Depending upon the specifications of the signal processing device 170 in actual implementation, the components of the signal processing device 170 may be combined or omitted or new components may be added.

Especially, the FRC 350 and the formatter 360 may be configured as separate modules or as a single module, outside the signal processing device 170.

Figure 4A:
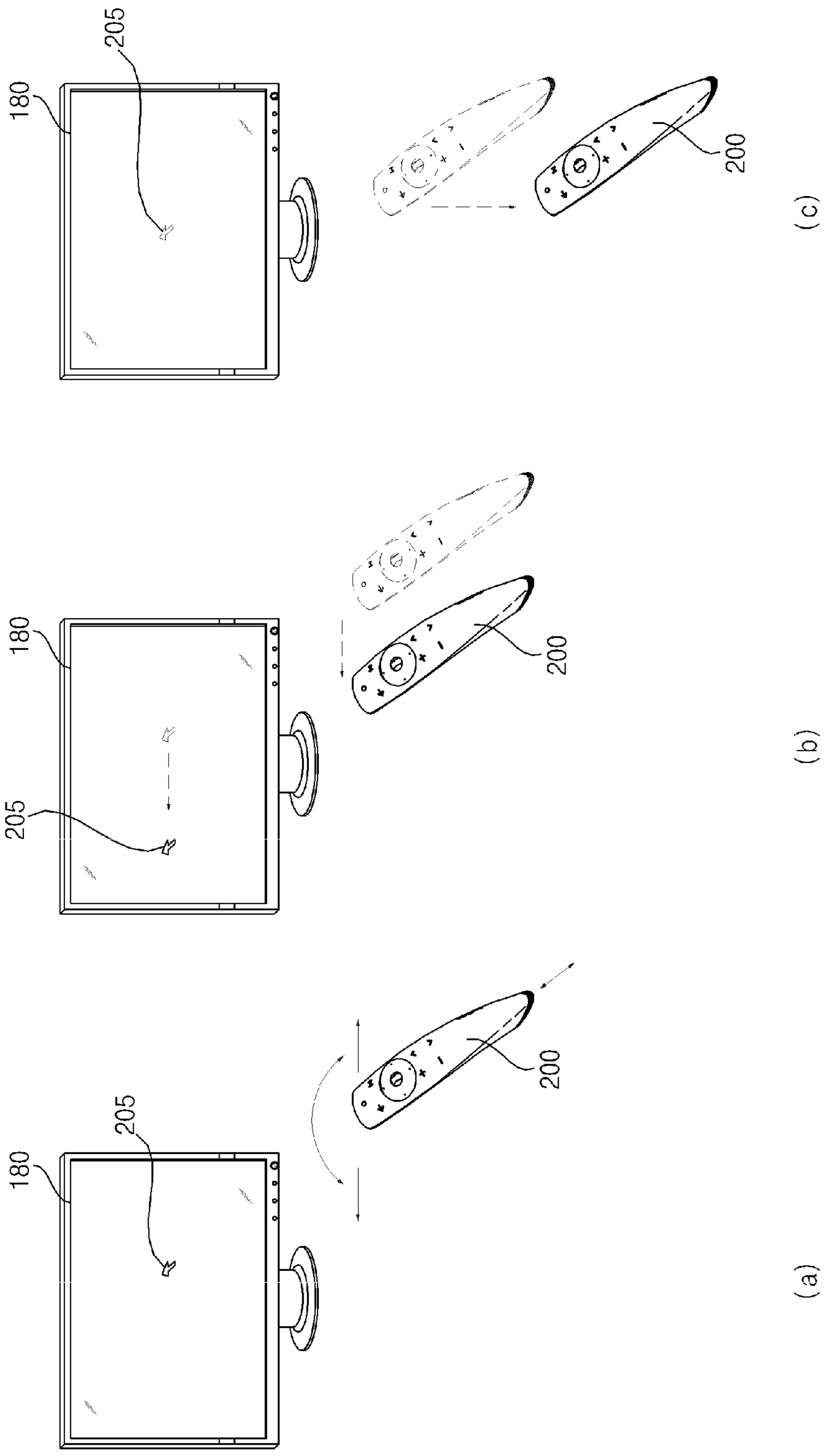
FIG. 4A is a view illustrating a method for controlling a remote controller illustrated in FIG. 2.

FIG. 4A illustrates a method for controlling the remote controller illustrated in FIG. 2.

(a) of FIG. 4A illustrates a pointer 205 representing movement of the remote controller 200, displayed on the display 180.

The user may move or rotate the remote controller 200 up and down, side to side ((b) of FIG. 4A), and back and forth ((c) of FIG. 4A). The pointer 205 displayed on the display 180 corresponds to movement of the remote controller 200. Since the pointer 205 moves in accordance with the movement of the remote controller 200 in a 3D space, the remote controller 200 may be referred to as a spatial remote controller or a 3D pointing device.

Referring to (b) of FIG. 4A, if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus may determine the movement of the remote controller 200 based on the motion information received from the remote controller 200, and calculate the coordinates of a target point to which the pointer 205 should be shifted in accordance with the movement of the remote controller 200 based on the result of the determination. The image display apparatus then displays the pointer 205 at the calculated coordinates.

Referring to (c) of FIG. 4A, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. On the other hand, in case in which the remote controller 200 moves away from the display 180, the selection area may be zoomed out and in case in which the remote controller 200 approaches the display 180, the selection area may be zoomed in.

With the predetermined button pressed in the remote controller 200, the up, down, left and right movements of the remote controller 200 may be ignored. That is, in case in which the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4B:
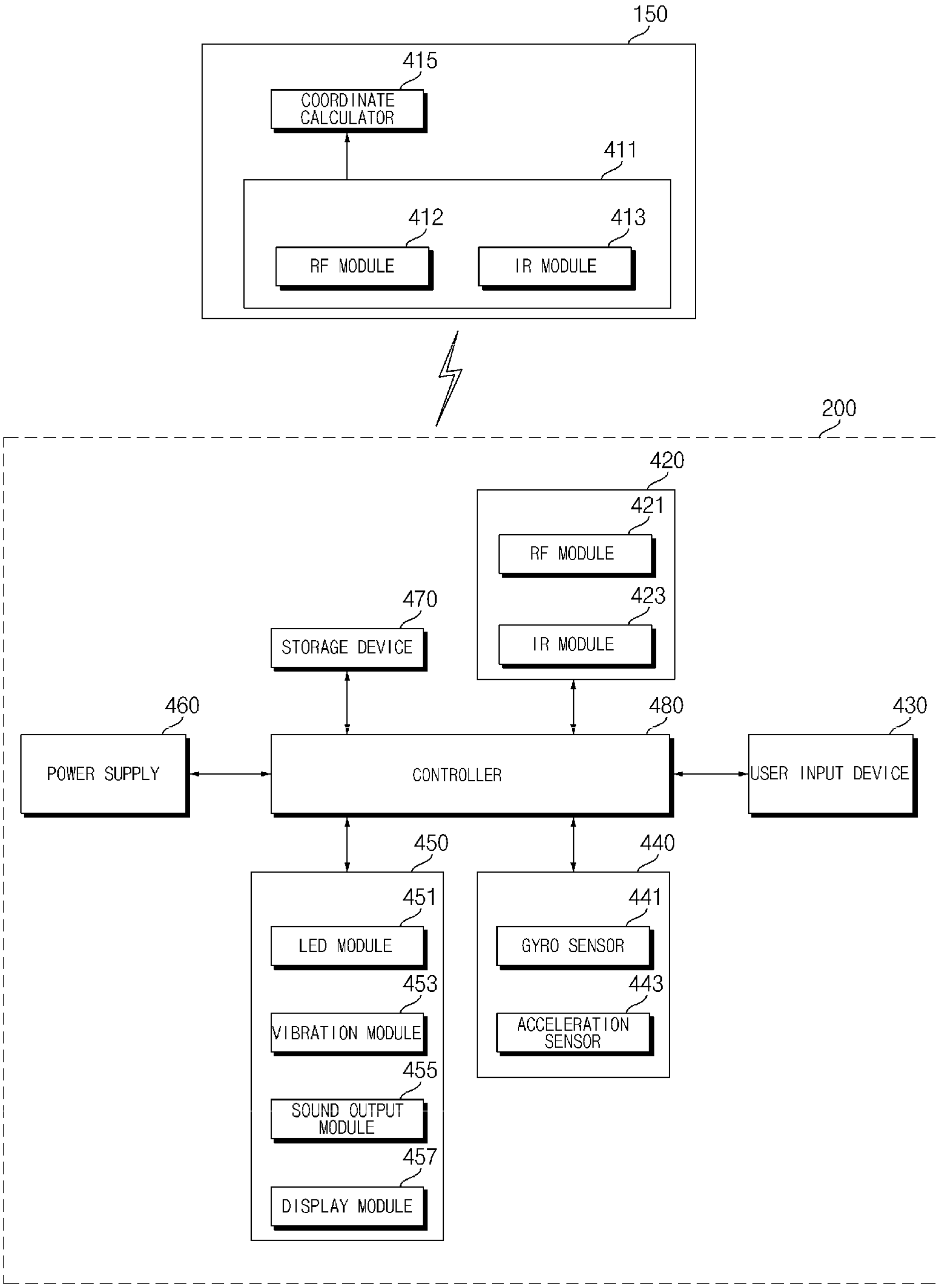
FIG. 4B is a block diagram illustrating the remote controller illustrated in FIG. 2.

FIG. 4B is a block diagram of the remote controller illustrated in FIG. 2.

Referring to FIG. 4B, the remote controller 200 may include a wireless transceiver 420, a user input device 430, a sensor device 440, an output device 450, a power supply 460, a memory 470, and a signal processing device 480.

The wireless transceiver 420 transmits signals to and/or receives signals from one of image display apparatuses according to embodiments of the present disclosure. One of the image display apparatuses according to embodiments of the present disclosure, that is, the image display apparatus 100 will be taken as an example.

In this embodiment, the wireless transceiver 420 may include an RF module 421 for transmitting RF signals to and/or receiving RF signals from the image display apparatus 100 according to an RF communication standard. Further, the wireless transceiver 420 may include an IR module 423 for transmitting IR signals to and/or receiving IR signals from the image display apparatus 100 according to an IR communication standard.

In this embodiment, the remote controller 200 may transmit a signal carrying information about movement of the remote controller 200 to the image display apparatus 100 through the RF module 421.

Further, the remote controller 200 may receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input device 430 may include a keypad, a plurality of buttons, a touch pad, or a touch screen. The user may enter commands to the image display apparatus 100 by manipulating the user input device 430. If the user input device 430 includes a plurality of hard-key buttons, the user may input various commands to the image display apparatus 100 by pressing the hard-key buttons. If the user input device 430 includes a touch screen displaying a plurality of soft keys, the user may input various commands to the image display apparatus 100 by touching the soft keys. The user input device 430 may also include various input tools other than those set forth herein, such as a scroll key and/or a jog key, which should not be construed as limiting the present disclosure.

The sensor device 440 may include a gyro sensor 441 and/or an acceleration sensor 443. The gyro sensor 441 may sense the movement of the remote controller 200.

For example, the gyro sensor 441 may sense motion information about the remote controller 200 in X-, Y-, and Z-axis directions. The acceleration sensor 443 may sense the moving speed of the remote controller 200. The sensor device 440 may further include a distance sensor for sensing the distance between the remote controller 200 and the display 180.

The output device 450 may output a video and/or audio signal corresponding to a manipulation of the user input device 430 or a signal transmitted by the image display apparatus 100. The user may easily identify whether the user input device 430 has been manipulated or whether the image display apparatus 100 has been controlled based on the video and/or audio signal output from the output device 450.

For example, the output device 450 may include an LED module 451 which is turned on or off whenever the user input device 430 is manipulated or whenever a signal is received from or transmitted to the image display apparatus 100 through the wireless transceiver 420, a vibration module

453 which generates vibrations, an audio output module 455 which outputs audio data, or a display module 457 which outputs an image.

The power supply 460 supplies power to the remote controller 200. If the remote controller 200 is kept stationary for a predetermined time or longer, the power supply 460 may, for example, cut off supply of power to the remote controller 200 in order to save power. The power supply 460 may resume supply of power if a specific key on the remote controller 200 is manipulated.

The memory 470 may store various programs and application data for controlling or operating the remote controller 200. The remote controller 200 may wirelessly transmit signals to and/or receive signals from the image display apparatus 100 in a predetermined frequency band through the RF module 421. The signal processing device 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The signal processing device 480 provides overall control to the remote controller 200. For example, the signal processing device 480 may transmit a signal corresponding to a key manipulation detected from the user input device 430 or a signal corresponding to motion of the remote controller 200, as sensed by the sensor device 440, to the image display apparatus 100 through the wireless transceiver 420.

The user input interface 150 of the image display apparatus 100 may include a wireless transceiver 411 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through an RF module 412. In addition, the user input interface 150 may wirelessly receive IR signals from the remote controller 200 through an IR module 413 according to the IR communication standard.

The coordinate calculator 415 may receive motion information regarding the movement of the remote controller 200 through the wireless transceiver 411 and may calculate coordinates (x, y) representing the position of the pointer 205 on a screen of the display 180 by correcting the motion information for possible errors or user hand tremor.

A signal received in the image display apparatus 100 from the remote controller 200 through the user input interface 150 may be transmitted to the signal processing device 170. Then, the signal processing device 170 may acquire information regarding the movement of the remote controller 200 and information regarding a key manipulation detected from the remote controller 200 from the signal received from the remote controller 200, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors or user hand tremor to the signal processing device 170.

In a further example, unlike the configuration of the remote controller 200 illustrated in FIG. 4B, the coordinate calculator 415 may reside in the signal processing device 170, instead of the user input interface 150.

Figure 5:
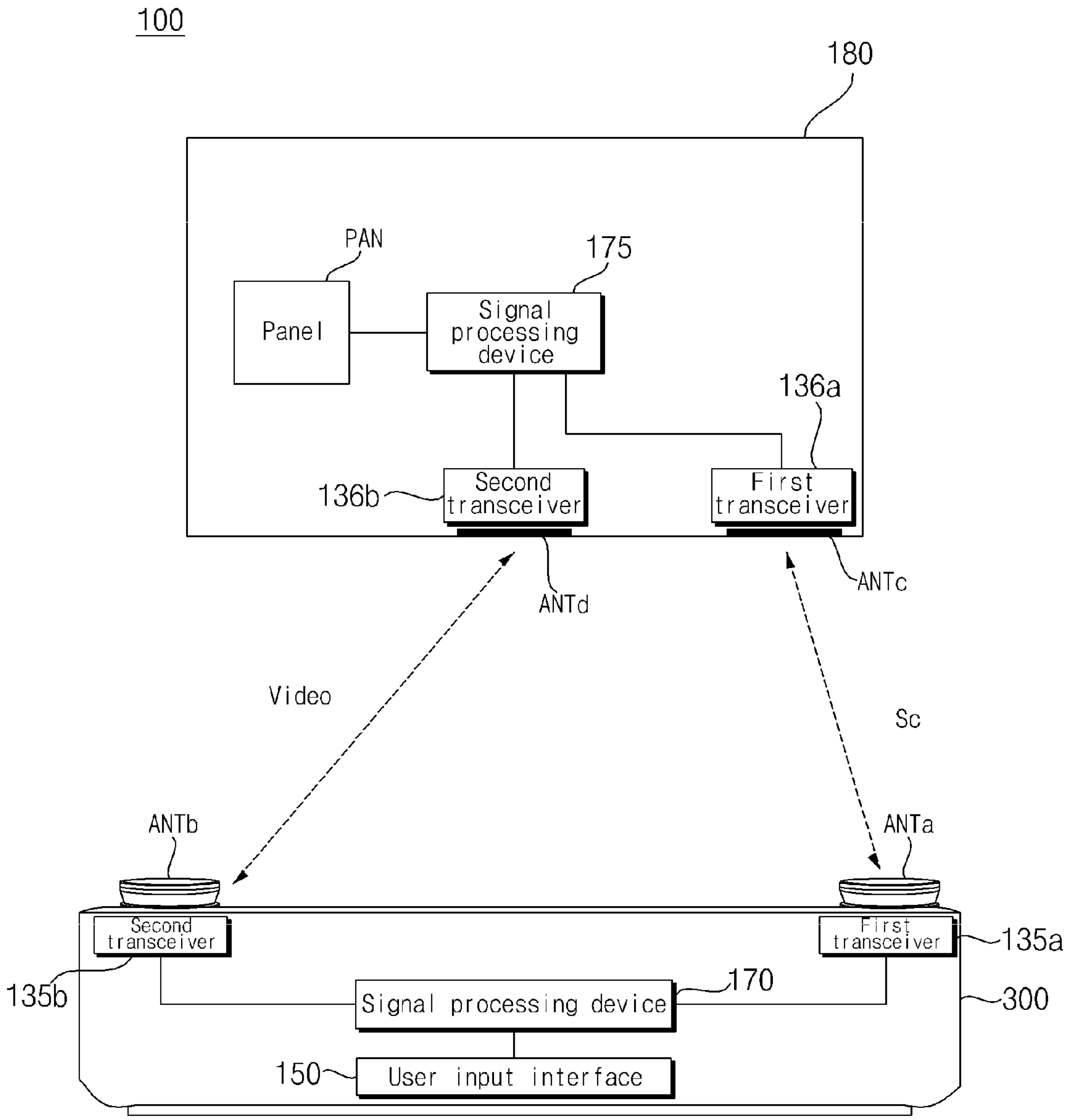
FIG. 5 illustrates one example of an internal block diagram of a wireless transmission apparatus and a display of FIG. 1.

FIG. 5 illustrates one example of an internal block diagram of a wireless transmission apparatus and a display of FIG. 1.

Referring to FIG. 5, the wireless transmission apparatus 300 may include an interface 150 receiving a signal from a remote controller 200, a first transceiver **135*a* performing wireless communication with the display 180 based on the first communication scheme, a second transceiver 135*b* transmitting image data to the display 180 based on the second communication scheme, and a signal processing device 170 controlling the first transceiver 135*a* and the second transceiver 135*b***.

Meanwhile, the first transceiver **135*a* may include a first antenna apparatus ANTa including a plurality of antenna elements and the second transceiver 135*b*** may include a second antenna apparatus ANTb including the plurality of antenna elements.

Meanwhile, the display 180 may include a first transceiver **136*a* performing wireless communication with the wireless transmission apparatus 300 based on the first communication scheme, a second transceiver 135*b* receiving the image data from the wireless communication apparatus 300 based on the second communication scheme, a panel PAN displaying the image data, and a signal processing device 175 controlling the first transceiver 136*a* and the second transceiver 135*b***.

Meanwhile, the first transceiver **136*a* may include a third antenna apparatus ANTc including the plurality of antenna elements and the second transceiver 136*b*** may include a fourth antenna apparatus ANTd including the plurality of antenna elements.

Meanwhile, the signal processing device 170 of the wireless transmission apparatus 300 may perform control to transmit a position calculation signal of the first wireless communication scheme to the display 180, receive a position calculation response signal from the display 180, and wirelessly transmit the image data to the display 180 by the second wireless communication scheme according to determined beamforming based on the received position calculation response signal.

Specifically, in case in which the first transceiver **135*a* of the wireless transmission apparatus 300 transmits the position calculation signal, the first transceiver 136*a* of the display 180 receives the position calculation signal. In addition, the first transceiver 136*a* of the display 180** transmits a position calculation response signal in response to the position calculation signal.

Accordingly, the first transceiver **135*a* of the wireless transmission apparatus 300** may receive the position calculation response signal.

In addition, the signal processing device 170 of the wireless transmission apparatus 300 may perform control to calculate positional information of the display 180 based on the position calculation response signal, and determine the beamforming based on the calculated positional information.

Here, the positional information may include distance information, angle information, etc., of the display 180.

In addition, the signal processing device 170 of the wireless transmission apparatus 300 may perform control to wirelessly transmit the image data to the display 180 by the second wireless communication scheme according to the determined beamforming, specifically, a determined beamforming angle, a determined beamforming intensity, etc.

Accordingly, the second transceiver 135*b* of the wireless transmission apparatus 300 transmits the image data, and the second transceiver 136*b* of the display 180 receives the image data.

In addition, the signal processing device 175 of the display 180 controls the received image data to be displayed in the panel PAN.

Consequently, the beamforming is determined based on the second wireless communication scheme that transmits the image data, and the beamforming is determined based on the first wireless communication scheme for control signal transmission not related to the image data to rapidly and stably perform wireless image data transmission between the wireless transmission apparatus 300 and the display 180.

Accordingly, seamless image display may be performed by the transmission of the wireless image data between the wireless transmission apparatus 300 and the display 180.

Figure 6:
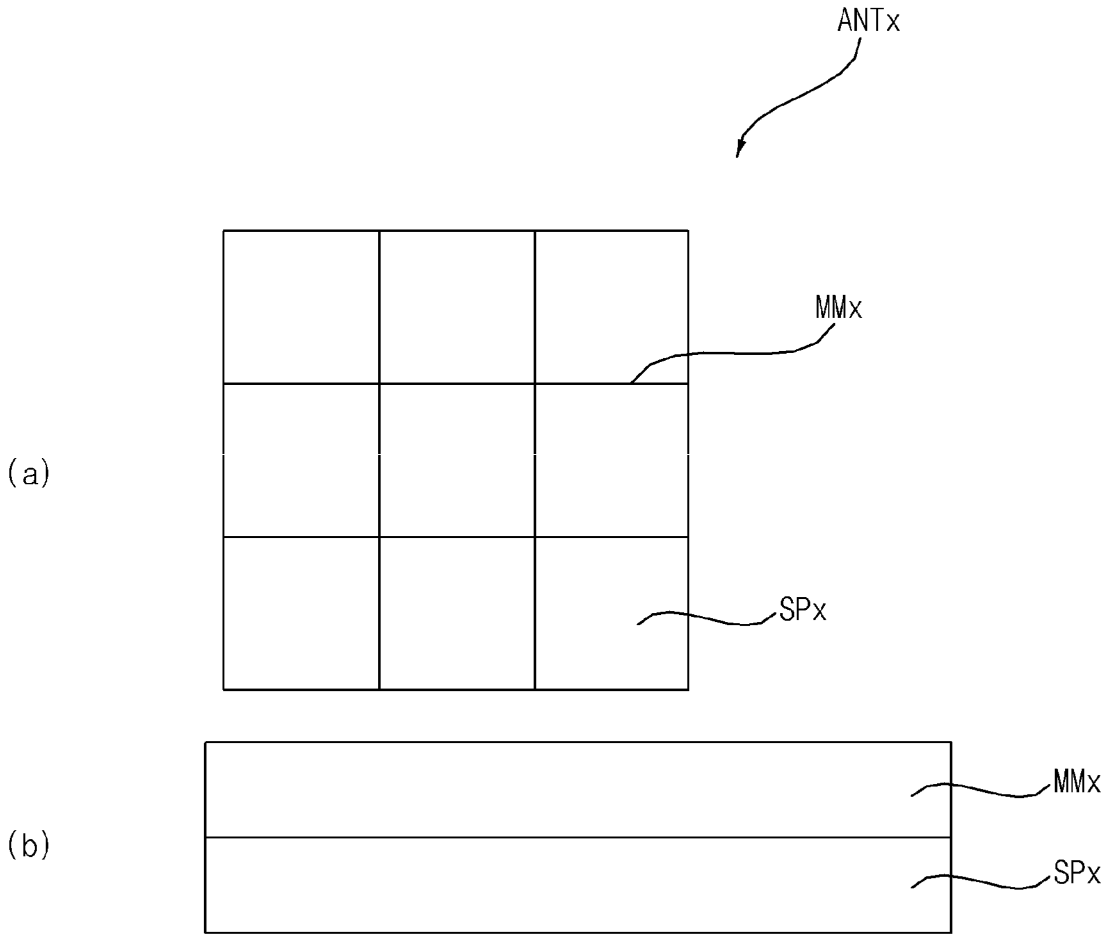
FIG. 6 illustrates an antenna apparatus related to the present disclosure.

FIG. 6 illustrates an antenna apparatus related to the present disclosure.

Referring to the figure, FIG. 6(*a*) shows a top view of the antenna apparatus ANTx, and FIG. 6(*b*) shows a side view of the antenna apparatus.

According to the prior literature, a conventional antenna apparatus ANTx includes a substrate SPx and a metal mesh MMx disposed on the substrate SPx.

On the other hand, when the metal mesh MMx is disposed on the transparent substrate SPx, despite the opacity of the metal mesh MMx, the antenna apparatus ANTx may appear transparent owing to the thickness of the metal mesh.

However, as shown in FIG. 6, when the antenna apparatus ANTx is implemented as a two-layer structure in which the metal mesh MMx is disposed on the transparent substrate SPx, a problem occurs in that, when the antenna apparatus ANTx is bent, the metal mesh MMx is stretched, and if the tensile limit is exceeded, the metal mesh MMx becomes disconnected.

Breakage of the metal mesh MMx occurs with high frequency at the interface between the opaque metal electrode to which a signal is supplied and the transparent metal mesh MMx or occurs mainly at locations where the shape of the metal mesh MMx changes rapidly. The generated disconnected area affects the impedance of the antenna apparatus ANTx, diminishes the efficiency of transmitting and receiving radio waves, and reduces the radio wave bandwidth.

Accordingly, an embodiment of the present disclosure proposes a method for preventing breakage of a metal mesh within a transparent antenna apparatus ANT. The proposed method will be described with reference to FIG. 7 below.

Figure 7:
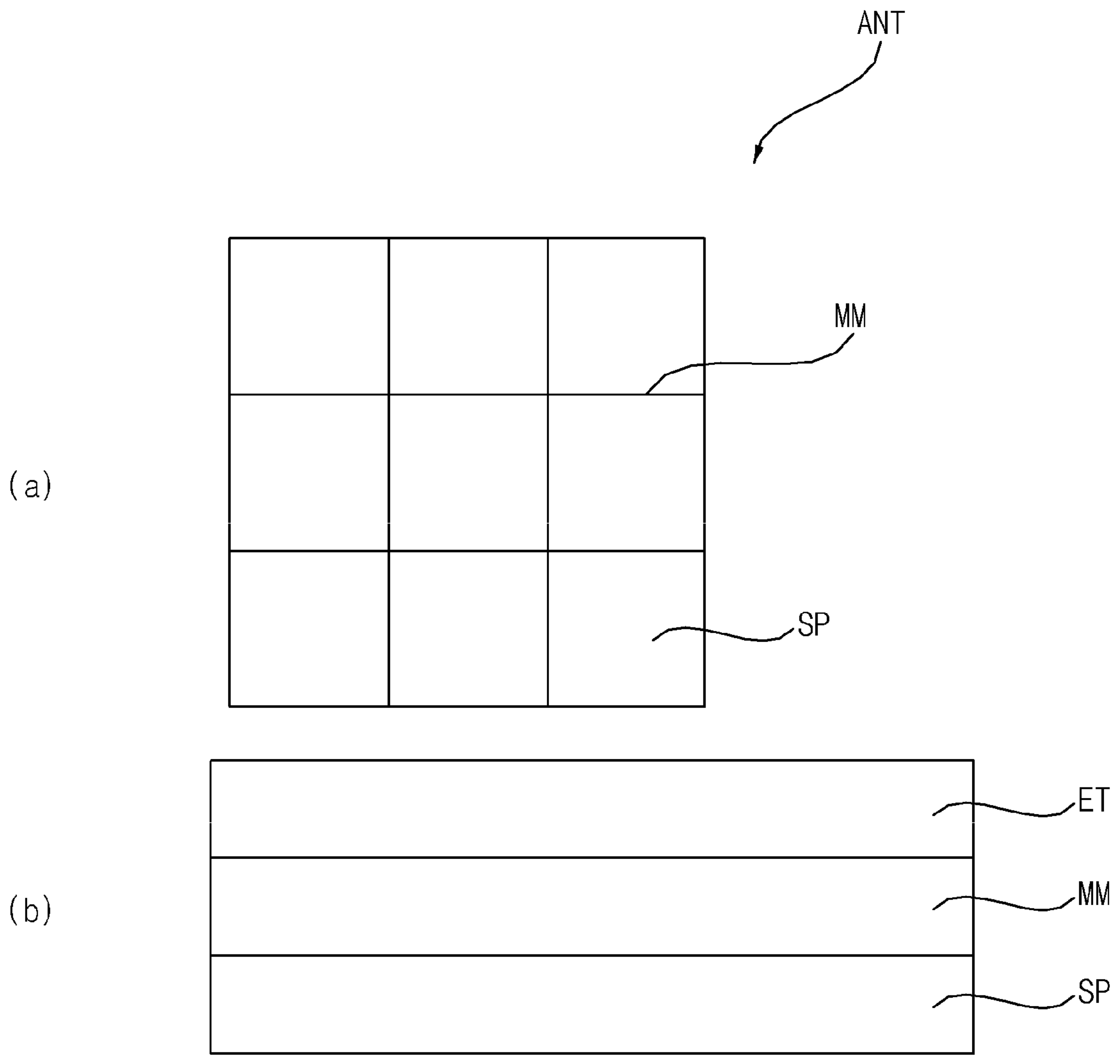
FIG. 7 illustrates an antenna apparatus according to an embodiment of the present disclosure.

FIG. 7 illustrates an antenna apparatus according to an embodiment of the present disclosure.

Referring to the figure, an antenna apparatus ANT according to an embodiment of the present disclosure comprises a substrate SP, a metal mesh MM disposed on a portion ARm2 of an upper portion of the substrate SP, and a protective layer ET disposed on the metal mesh MM, wherein the protective layer ET and the substrate SP are more transparent than the metal mesh MM. Accordingly, breakage of the metal mesh MM inside a transparent antenna apparatus ANT may be reduced. In particular, breakage of the metal mesh MM within a flexible transparent antenna apparatus ANT may be reduced.

On the other hand, when the metal mesh MMx is disposed on the transparent substrate SPx, despite the opacity of the metal mesh MMx, the antenna apparatus ANTx may appear transparent owing to the thickness of the metal mesh.

Meanwhile, the antenna apparatus ANT may be implemented to have a three-layer structure by disposing the protective layer ET on top of the metal mesh MM, thereby covering the metal mesh MM; when the protective layer ET is transparent, the antenna device ANT may appear transparent.

Meanwhile, since the protective layer ET is disposed on the metal mesh MM and holds the metal mesh MM not to be stretched beyond the limit of the metal mesh MM even if the antenna apparatus ANT is bent, preventing the metal mesh MM from stretching beyond the tensile limit and thus significantly reducing the probability of breakage of the metal mesh MM. Furthermore, the reliability of the antenna apparatus ANT may be ensured.

Meanwhile, the protective layer ET is intended to reduce breakage of the metal mesh MM and may also be referred to as an electrode-reinforced transparent layer.

Meanwhile, to eliminate the foreign substance sensation caused by the boundary of the protective layer ET, it is desirable for the protected area covered by the protective layer ET to include not only the entire metal mesh MM area but also a significant portion of the substrate SP. For example, a structure where the protective layer ET covers the entire area of the substrate SP is also possible.

Meanwhile, the protective layer ET includes an optically clear adhesive (OCA) and a polyethylene terephthalate (PET) film placed on top of the OCA.

When the thickness of the optically clear adhesive (OCA) is less than 15 μm, the manufacturing process becomes difficult, making mass production challenging; conversely, when the thickness of the OCA exceeds 50 μm, there is a significant increase in signal loss.

Therefore, it is desirable for the thickness of the optically clear adhesive (OCA) to fall within the range of 15 and 50 μm. The desired thickness allows for mass production and enables the use of OCA with reduced signal loss.

When the thickness of the polyethylene terephthalate (PET) film is less than 12 μm, the manufacturing process become difficult, making mass production challenging; conversely, when the thickness of the PET film exceeds 25 μm, there is a significant increase in signal loss.

Therefore, it is desirable for the thickness of the polyethylene terephthalate (PET) film to fall within the range of 12 and 25 μm. The desired thickness allows for mass production and enables the use of PET film with reduced signal loss.

Meanwhile, when the protective layer Eta is not employed, the antenna gain of the antenna apparatus ANTx of FIG. 6 may range approximately from 14.0 to 14.5 dBi.

Meanwhile, as shown in FIG. 7, when a protective layer ET is employed, the polyethylene terephthalate (PET) film has a thickness of 25 μm, and the optically transparent adhesive (OCA) has a thickness of 15 μm, the antenna gain may become approximately 14.0 to 14.5 dBi. Therefore, it becomes possible to reduce breakage of the metal mesh while experiencing almost no signal loss.

Meanwhile, as shown in FIG. 7, when a protective layer ET is employed, the polyethylene terephthalate (PET) film has a thickness of 80 μm, and the optically transparent adhesive (OCA) has a thickness of 100 μm, the antenna gain may become approximately 14.0 to 14.5 dBi, resulting in a gain reduction of approximately −4 dBi. Therefore, significant signal loss occurs.

As a result, it is desirable that the thickness of the optically transparent adhesive (OCA) ranges from 15 to 50 μm, and the thickness of the polyester (PET) film ranges from 12 to 25 μm.

Meanwhile, the substrate SP may include at least one of PET film, Cyclo Olefin Polymer (COP), or colorless polyimide (CPI) as a transparent substrate.

At this time, it is desirable that the PET film has excellent optical performance and dielectric characteristics, with a dielectric constant of 3.0 to 3.2 and dielectric loss of 0.005 to 0.01.

Meanwhile, it is desirable that Cyclo Olefin Polymer (COP) has excellent optical performance and dielectric characteristics, with a dielectric constant of 2.6 or less and dielectric loss of 0.001 or less.

Meanwhile, colorless polyimide (CPI) exhibits excellent heat-resistant properties.

Meanwhile, the substrate SP may be a transparent flexible substrate SP. Accordingly, breakage of the metal mesh MM within the flexible transparent antenna apparatus may be reduced.

Meanwhile, the metal mesh MM may include copper Cu to provide low resistance. Accordingly, it is possible to implement a metal mesh MM with good electrical conductivity.

Meanwhile, it is desirable that the metal mesh MM includes a transparent electrode with a sheet resistance of 2Ω/□ or less, which is expected to yield excellent radio wave radiation efficiency in the high frequency band of 24 to 100 GHz, known as the mmWave band.

Meanwhile, to lower the sheet resistance of the metal mesh MM, the metal mesh MM is desired to have a thickness of 0.5 to 2 μm.

Meanwhile, to secure the optical transmittance of the transparent antenna apparatus ANT, it is desirable that the metal mesh MM has a line with of 3 mm or less, and the metal mesh spacing is 300 mm or less.

Meanwhile, the metal mesh MM may include at least one of Indium Tin Oxide (ITO), Carbon Nanotube (CNT), and Nano-silverwire.

Meanwhile, it is desirable that the protective layer ET has a lower dielectric constant and lower dielectric loss than the substrate SP. In particular, since the protective layer ET is required to allow smooth passage of radio waves, it is desirable to use a low-dielectric protection layer ET.

For example, it is desirable that the protective layer ET is made of a material with excellent dielectric properties, ensuring adhesion of 0.5 kgf/cm2 or more to the transparent substrate SP and metal mesh MM, optical transmittance of 90% or more, and improved radio wave transmission performance. In other words, a low dielectric protective layer ET is preferred.

Specifically, the protective layer ET preferably has a dielectric constant of 3.0 or less and a dielectric loss of 0.005 or less.

Figure 8:
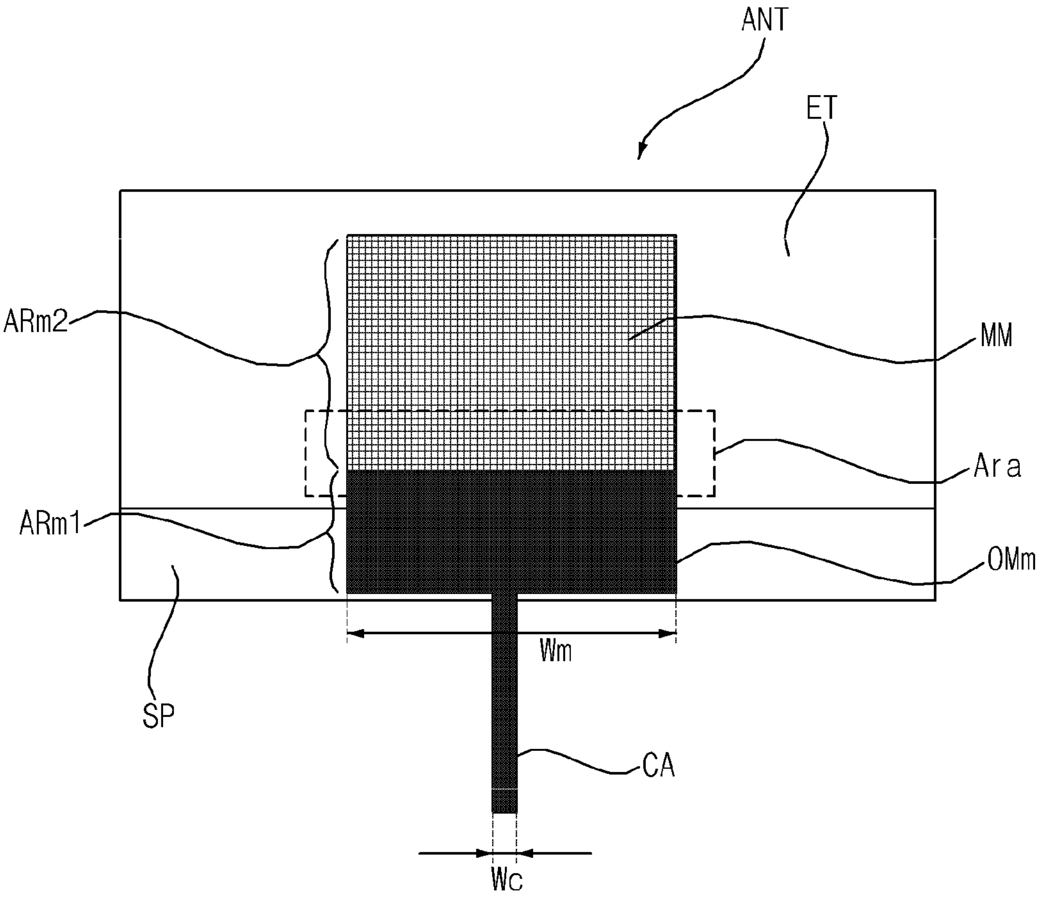
FIGS. 8 to 13 are drawings referenced for the description of FIG. 7.
Figure 8:

FIGS. 8 to 13 are drawings referenced for the description of FIG. 7. In particular, FIG. 8 illustrates one example of the antenna apparatus of FIG. 7 in detail.

Referring to the figure, an antenna apparatus ANT according to an embodiment of the present disclosure may further include an opaque metal electrode OMm in a first area Arm1 of an upper portion of the substrate SP.

In particular, an opaque metal electrode OMm is formed in the first area Arm1 of an upper portion of the substrate SP, and a metal mesh MM is formed in a second area ARm2 of an upper portion of the substrate SP.

At this time, the protective layer ET may be formed in a portion of the first area Arm1 and an upper portion of the second area Arm2.

Typically, there is a high possibility of breakage in the boundary area Ara between the opaque metal electrode OMm that supplies an RF signal and the metal mesh MM, within the antenna apparatus ANT.

Accordingly, in an embodiment of the present disclosure, it is proposed that the protective layer ET covers the entire area of the metal mesh MM and the boundary area Ara between the opaque metal electrode OMm and the metal mesh MM.

Accordingly, the possibility of breakage in the boundary area Ara between the opaque metal electrode OMm and the metal mesh MM is significantly reduced.

Meanwhile, according to the design, the width Wm of the opaque metal electrode OMm and the width of the metal mesh MM may be the same.

Meanwhile, a signal feed line CA having a width Wc narrower than the width Wm of the opaque metal electrode OMm may be connected to one end of the opaque metal electrode OMm. Accordingly, a signal received from the antenna apparatus ANT may be transmitted, or a signal may be transmitted to the antenna apparatus ANT.

Figure 9:
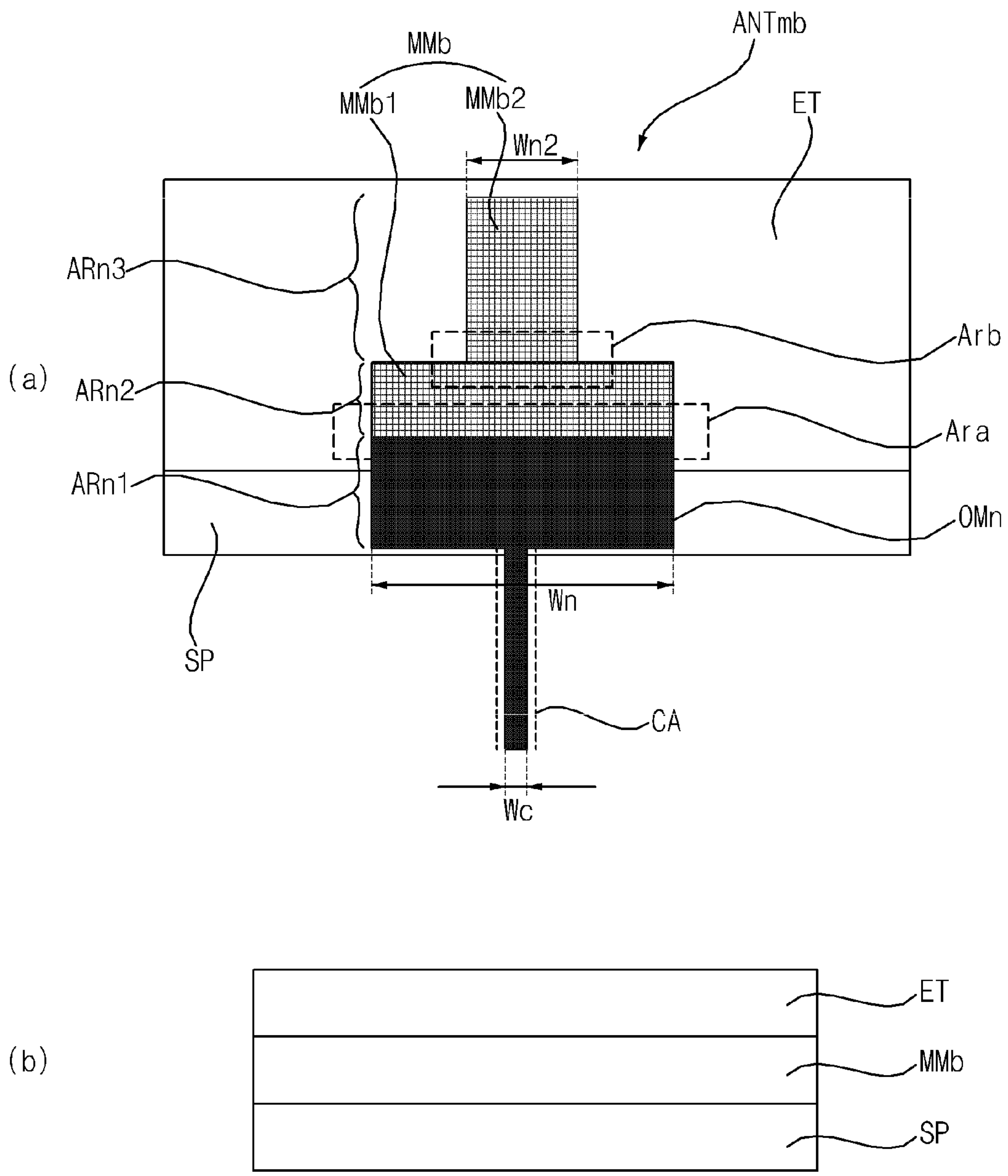

FIG. 9 illustrates another example of the antenna apparatus of FIG. 7 in detail.

Referring to the figure, an antenna apparatus ANTmb comprises a substrate SP, a metal mesh MMb disposed on a portion ARn2 of an upper portion of the substrate SP, and a protective layer ET disposed on the metal mesh MMb, wherein the protective layer ET and the substrate SP are more transparent than the metal mesh MMb.

Meanwhile, an opaque metal electrode OMn may be formed in a first area ARn 1 of an upper portion of the substrate SP, a first metal mesh MMb1 may be formed in a second area ARn2 of an upper portion of the substrate SP, a second metal mesh MMb2 may be formed on a third area ARn3 of an upper portion of the substrate SP.

Meanwhile, according to the design, the first metal mesh MMb1 with a first width Wn may be formed, and the second metal mesh MMb2 with a second width Wn2, which is narrower than the first width Wn, may be formed.

The protective layer ET may be formed on a portion of the first area ARn1, the second area ARn2, and an upper portion of the third area ARn3.

Typically, there is a high possibility of breakage in the boundary area Ara between the opaque metal electrode OMn that supplies an RF signal and the metal mesh MM and in the boundary area Arb between the first metal mesh MMb1 and the second metal mesh MMb2, within the antenna apparatus ANT.

Accordingly, in an embodiment of the present disclosure, it is proposed that the protective layer ET covers the entire area of the first metal mesh MMb1 and the second metal mesh MMb2 and the boundary area Ara between the opaque metal electrode OMn and the first metal mesh MMb1.

Accordingly, the possibility of breakage in each boundary area Ara and the boundary area Arb is significantly reduced.

Meanwhile, the width Wn of the opaque metal electrode OMn and the width Wn of the first metal mesh MMb1 are the same, and a signal feed line CA having a width Wc narrower than the width Wn of the opaque metal electrode OMn may be connected to one end of the opaque metal electrode OMn. Accordingly, a signal received from the antenna apparatus ANTmb may be transmitted, or a signal may be transmitted to the antenna apparatus ANTmb.

Figure 10A:
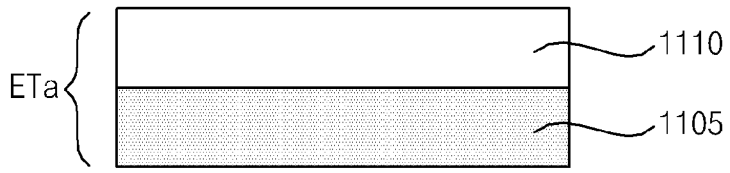

FIG. 10A illustrates one example of an internal structure of the protective layer of FIG. 7.

Referring to the figure, the protective layer ETa may include an adhesive layer 1105 and a flexible polymer film 1110 disposed on the adhesive layer 1105. Accordingly, breakage of a metal mesh MM inside a transparent antenna apparatus ANT may be reduced.

Meanwhile, the flexible polymer film 1110 may include at least one of ester film, polyester resin, polyolefin resin, acrylic resin, styrene resin, cellulose resin, triacetyl cellulose, imide resin, or polycarbonate resin.

Meanwhile, the adhesive layer may include at least one of Optically Clear Adhesive (OCA) or Optically Clear Resin (OCR).

Figure 10B:

FIG. 10B illustrates another example of an internal structure of the protective layer of FIG. 7.

Referring to the figure, the protective layer ETb may include a flexible polymer film 1120.

Meanwhile, the flexible polymer resin 1120 may include at least one of polyester resin, polyolefin resin, acrylic resin, styrene resin, cellulose resin, triacetyl cellulose, imide resin, polycarbonate resin, curing initiator, or viscosity modifier.

Figure 11A:
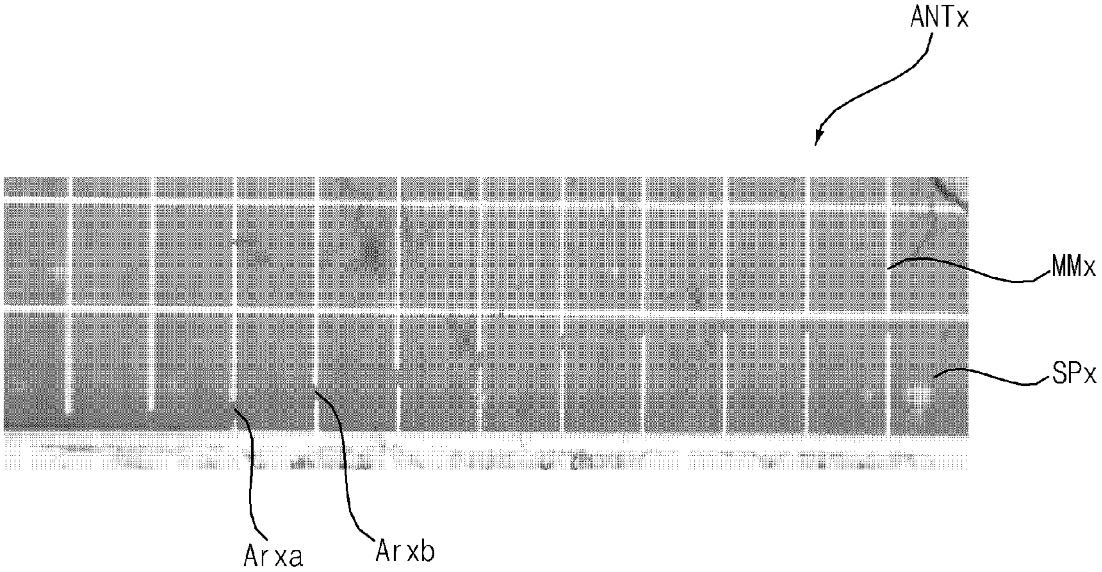

FIG. 11A illustrates a substrate SPx and a metal mesh MMx within the antenna apparatus ANTx of FIG. 6.

Referring to the figure, when the antenna apparatus ANTx is implemented as a two-layer structure, and the antenna apparatus ANTx is bent, the metal mesh MMx is stretched, and the metal mesh MMx becomes disconnected accordingly.

In the figure, it is assumed that breakage occurs in the areas Arxa, Arxb.

The generated disconnected area Arxa, Arxb affects the impedance of the antenna apparatus ANTx, diminishes the efficiency of transmitting and receiving radio waves, and reduces the radio wave bandwidth.

Figure 11B:
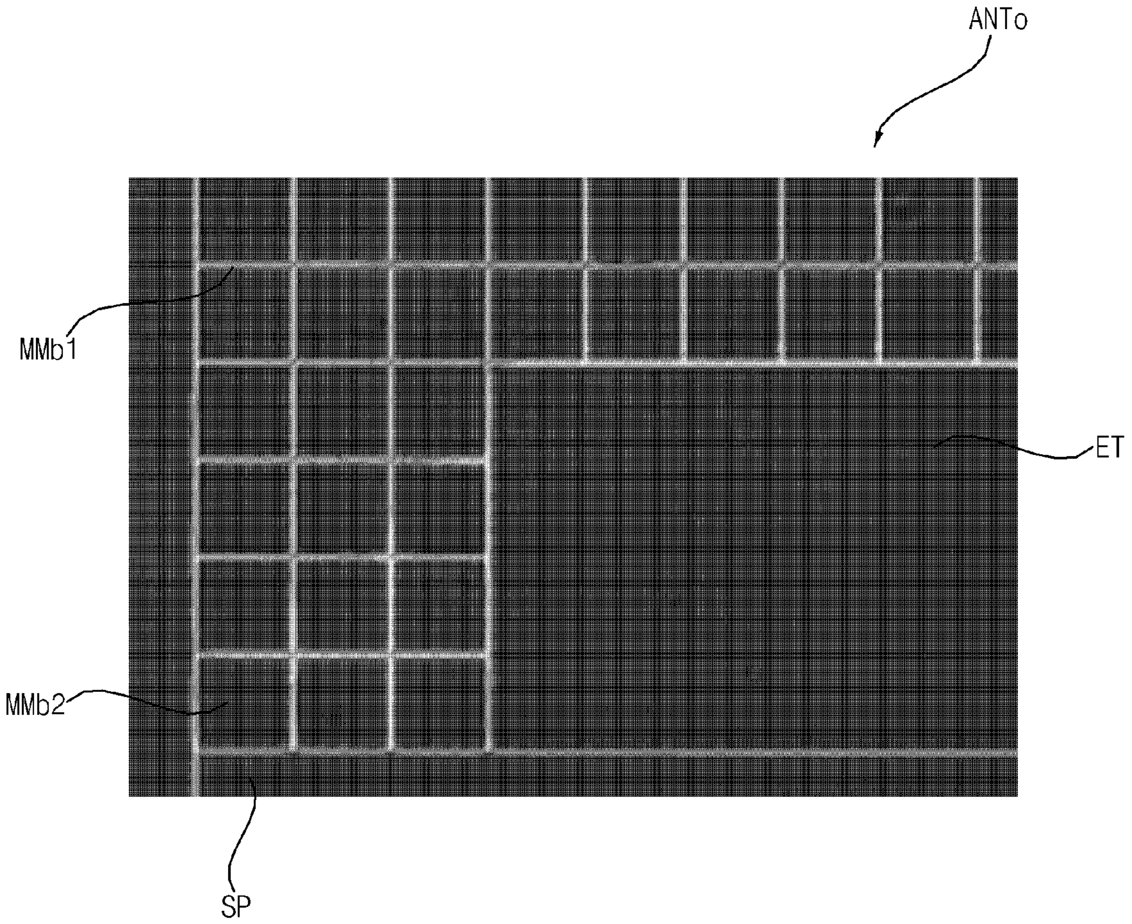

FIG. 11B illustrates a substrate SP and a metal mesh MM within the antenna apparatus ANT of FIG. 7.

Referring to the figure, in the antenna apparatus ANT implemented as a three-layer structure according to an embodiment of the present disclosure, when the antenna apparatus ANT is bent, the metal mesh MM is stretched; however, owing to the protective layer ET, the metal mesh MM is protected, and breakage or disconnection does not occur.

In the figure, it is assumed that a portion of the metal mesh MM is denoted by MMb1, MMb2.

Breakage does not occur over the entire area, including the portion MMb1, MMb2 of the metal mesh MM, and as a result, the reliability of the antenna apparatus ANT may be ensured.

Meanwhile, since the signal loss of the antenna device ANT is proportional to the frequency, communication in the band ranging from 24 to 100 GHz inherently experiences greater signal loss due to the dielectric material than low-frequency communication.

Meanwhile, the signal loss of the antenna device ANT is proportional to ½ of the dielectric constant and is proportional to the dielectric loss.

Therefore, when implementing an antenna device ANT, disposing a dielectric material with low dielectric properties around the conductor may reduce signal loss.

Meanwhile, the best dielectric material with low dielectric properties is air (dielectric constant is 1), but considering insulation from surrounding elements, component reliability, and accurate shape implementation of the antenna conductor, materials with the dielectric constant relatively higher than air should be used.

Also, considering cost, it is advantageous to use materials with low dielectric constant and low dielectric loss.

Figure 11C:
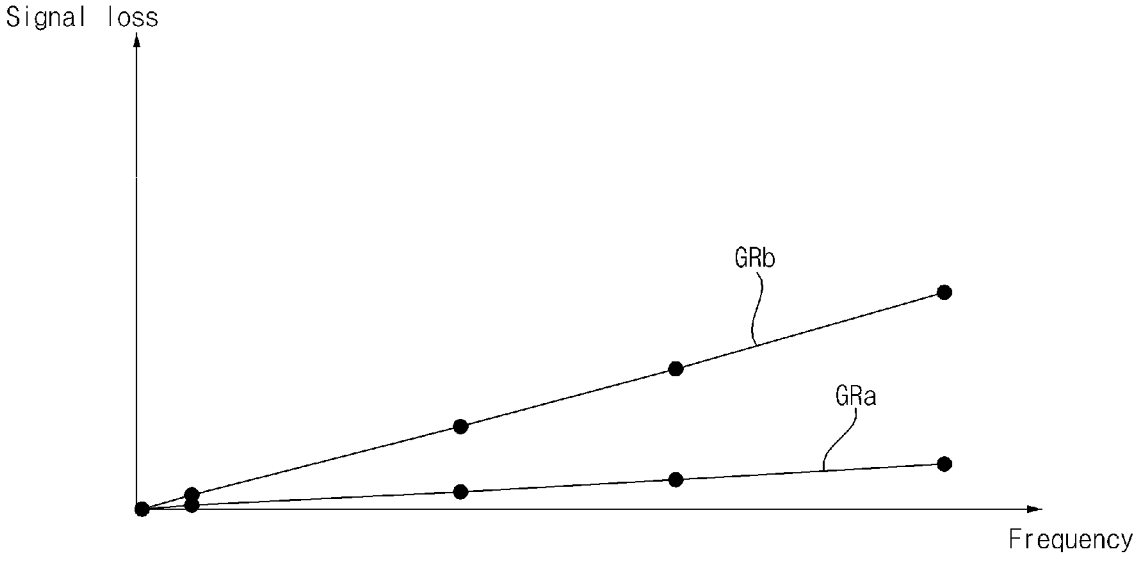

FIG. 11C shows a signal loss graph for each frequency according to the material used for the substrate.

Referring to the figure, a first graph GRa is a signal loss graph for each frequency when COP substrate SP with a dielectric loss of 0.001 is employed, and a second graph GRb is a signal loss graph for each frequency when PET substrate SP with a dielectric loss of 0.005 is employed.

Referring to the first graph GRa and the second graph GRb, as the frequency increases in the antenna apparatus ANT, signal loss due to the substrate SP increases.

However, since the embodiment of the present disclosure employs a wireless communication frequency of approximately 60 GHz or less, examining the signal loss at a frequency of 60 GHz or less reveals no significant signal loss is observed from the PET substrate SP and the COP substrate SP.

Therefore, in a communication environment below the frequency of 60 GHz, the substrate SP of the antenna device ANT may include at least one of PET film, Cyclo Olefin Polymer, or colorless polyimide.

Meanwhile, when a wireless communication frequency exceeding a frequency of approximately 60 GHz is employed, signal loss increases in the high frequency band as the frequency increases, the COP substrate may be more preferable than the PET substrate as a substrate SP of the antenna apparatus ANT.

Figure 12:
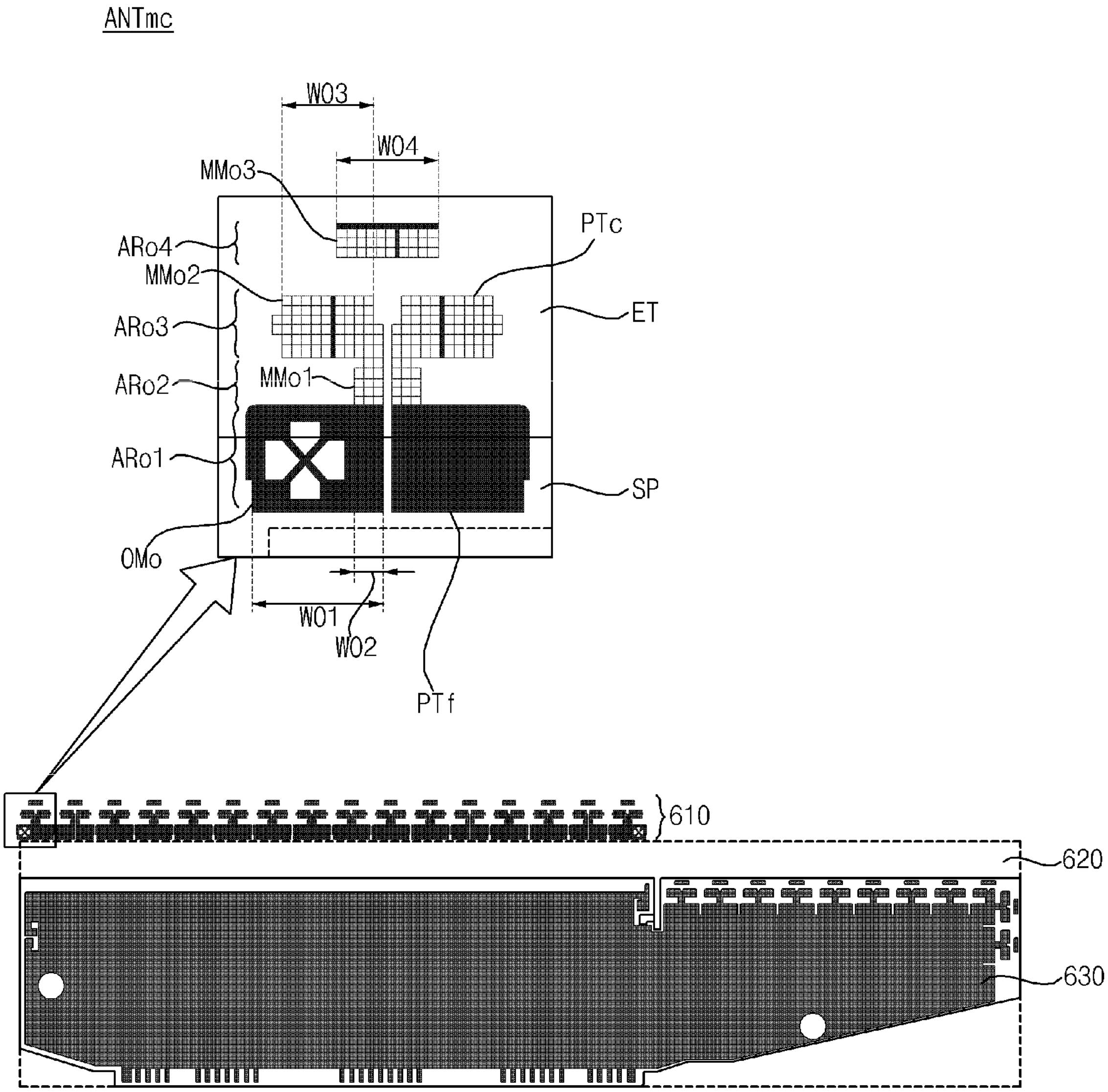

FIG. 12 illustrates another example of an internal structure of the antenna apparatus of FIG. 7.

Referring to the figure, an antenna apparatus ANTmc according to an embodiment of the present disclosure may further comprise a flexible printed circuit board 630, a joining member 620, of which one end is connected to one end of the flexible printed circuit board 630, and an opaque metal electrode OMo, of which one end is connected to the other end of the joining member 620.

The flexible printed circuit substrate 630 may be made of polyimide (PI) material to ensure flexibility.

Meanwhile, the opaque metal electrode OMo may be disposed in the first area Aro1 of an upper portion of the joining member 620.

Meanwhile, the antenna apparatus ANTmb may comprise a substrate SP, a metal mesh MM disposed on a portion of an upper portion of the substrate SP, and a protective layer ET disposed on the metal mesh MM, wherein the protective layer ET and the substrate SP are more transparent than the metal mesh MM.

Meanwhile, one end of a first part MMo1, which forms a portion of the metal mesh, may be connected to the other end of the opaque metal electrode OMo. In other words, the first part MMo1 may be disposed in the second area ARo2 which forms an upper portion of the opaque metal electrode OMo.

Meanwhile, one end of a second part MMo2, which forms another portion of the metal mesh, may be connected to the other end of the first part MMo1, which forms a portion of the metal mesh. In other words, the second part MMo1 may be disposed in the third area ARo3 which forms an upper portion of the first part MMo1.

Meanwhile, one end of a third part MMo3, which forms still another portion of the metal mesh, may be connected to the other end of the second part MMo2, which forms another portion of the metal mesh. In other words, the third part MMo3 may be disposed in the fourth area ARo4 which forms an upper portion of the second part MMo2.

The protective layer ET may cover the entire area of the metal mesh and a portion of the opaque metal electrode OMo.

Accordingly, breakage of the metal mesh within the transparent antenna apparatus ANTmc may be reduced.

In particular, breakage may be reduced in the boundary area between the opaque metal electrode OMo and the first part MMo1, the boundary area between the first part MMo1 and the second part MMo2, and the boundary area between the second part MMo2 and the third part MMo3.

Meanwhile, the width WO1 of the opaque metal electrode OMo may be wider than the width WO2 of the first part MMo1, and the width WO2 of the first part MMo1 may be wider than the width WO3 of the second part MMo2 and the width WO4 of the third part MMo3.

Depending on the structure of the opaque metal electrode OMo and the metal mesh shown in the figure, it becomes possible to achieve signal reception or transmission with reduced signal loss.

In particular, it become possible to receive or transmit signals with reduced signal loss while securing a stable communication bandwidth when the frequency is higher than 24 GHz.

Figure 13:
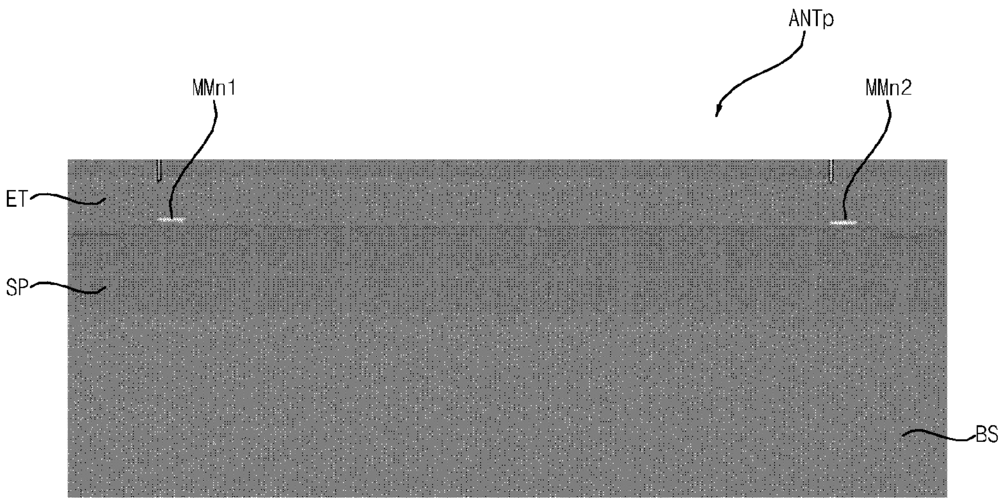

FIG. 13 illustrates an antenna apparatus ANTp according to another embodiment of the present disclosure.

Referring to the figure, a transparent substrate SP is disposed on the base BS, a first metal mesh MMn1 is disposed on a portion of an upper portion of the transparent substrate SP, a second metal mesh MMn2, being separated from the first metal mesh MMn1, is disposed on another portion of the upper portion of the transparent substrate SP.

Meanwhile, a protective layer ET is disposed on the first metal mesh MMn1 and the second metal mesh MMn2.

At this time, the protective layer ET and the substrate SP are more transparent than the first metal mesh MMn1 and the second metal mesh MMn2. Therefore, breakage of the metal mesh within the transparent antenna apparatus ANTp may be reduced.

FIGS. 14A to 14D illustrate various applications of an antenna apparatus according to an embodiment of the present disclosure.

Figure 14A:
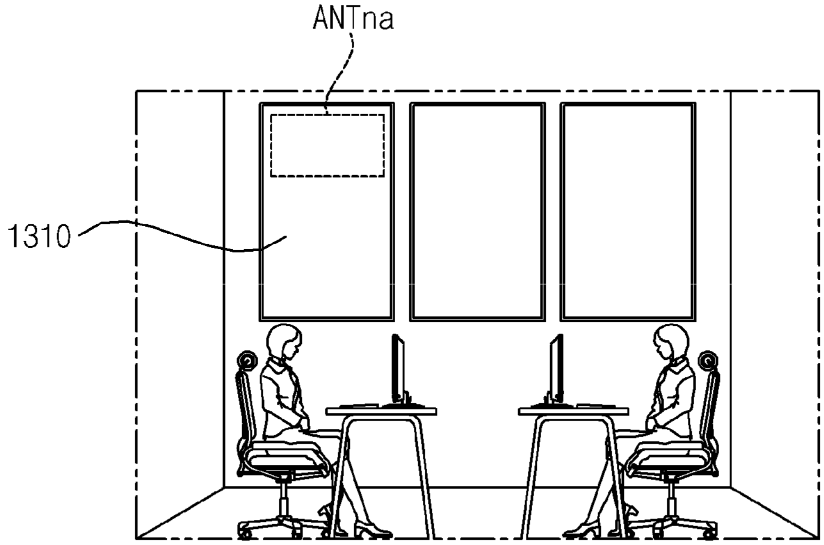
FIGS. 14A to 14D illustrate various applications of an antenna apparatus according to an embodiment of the present disclosure.

Referring to the figure, FIG. 14A illustrates a case where a transparent antenna apparatus ANTna is attached to a building window 1310.

Figure 14B:
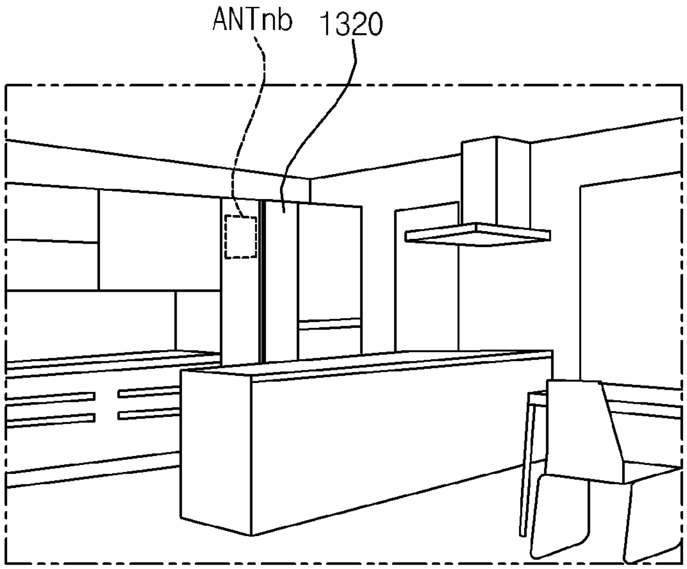

FIG. 14B illustrates a case where a transparent antenna apparatus ANTnb is attached to the case of an electronic device 1320 such as a refrigerator.

Figure 14C:
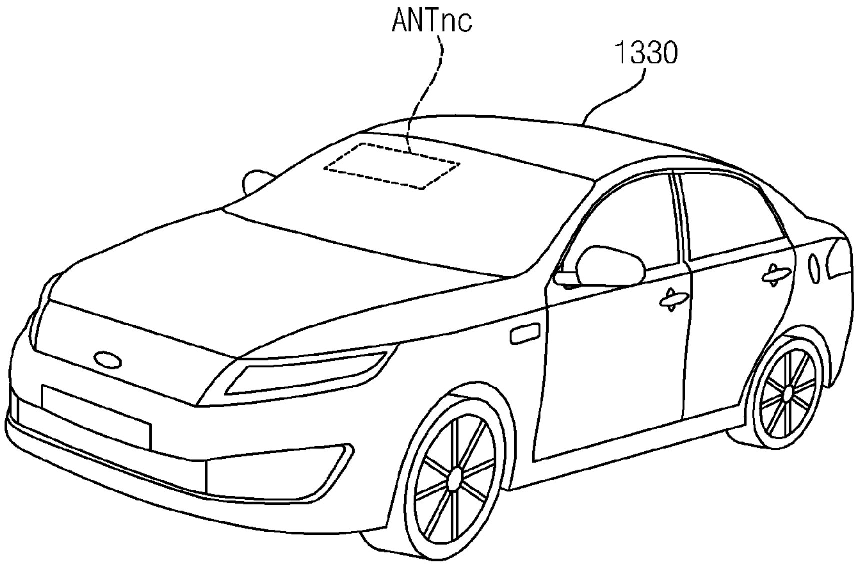

FIG. 14C illustrates a case where a transparent antenna apparatus ANTnc is attached to the wind shield of a vehicle 1330.

Figure 14D:
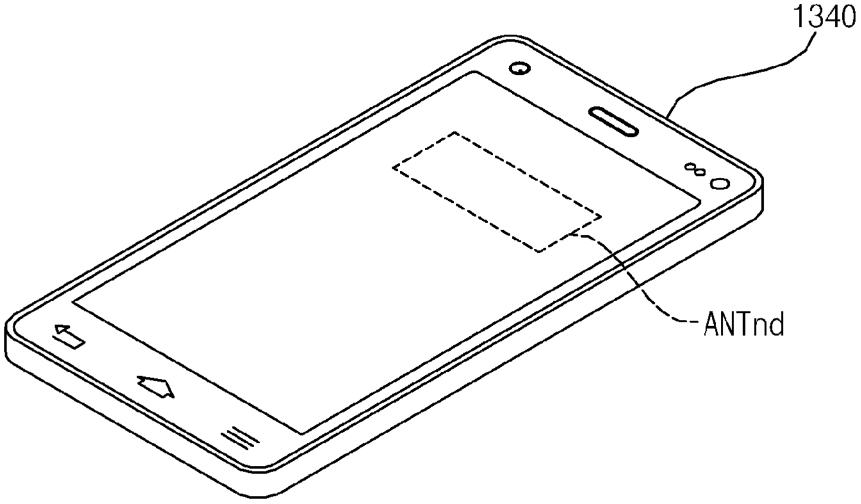

FIG. 14D illustrates a case where a transparent antenna apparatus ANTnd is attached to the display of a mobile terminal 1340.

The antenna apparatus ANTna to ANTnd of FIGS. 14A to 14D may correspond to the antenna apparatus of FIGS. 7 to 13, respectively.

Meanwhile, the antenna apparatus according to the embodiments of the present disclosure described with reference to FIGS. 7 to 13 may be attached to various devices, buildings, or structures in addition to the examples of FIGS. 14A to 14D.

Configurations and methods of the described embodiments may not be limitedly applied to the antenna apparatus and the image display apparatus including the same according to the embodiment of the present disclosure, but all or some of the respective embodiments may be selectively combined and configured so as to be variously modified.

Further, although the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

INDUSTRIAL APPLICABILITY

The present disclosure is applicable to an antenna apparatus and an image display apparatus including the same, and more particularly, applicable to an antenna apparatus capable of reducing breakage of a metal mesh within a transparent antenna apparatus and an image display apparatus including the same.

What is claimed is:

1. An image display apparatus comprising:

a display;

a wireless transmission device separated from the display and configured to transmit video data to the display through a wireless communication scheme; and at least one antenna apparatus including:

a first part of the at least one antenna apparatus that is disposed on an area corresponding to a panel of the display;

a second part of the at least one antenna device that is disposed in an area corresponding to a front frame around the panel;

a substrate;

an opaque metal electrode disposed in a first area on an upper portion of the substrate;

a metal mesh disposed in a second area on the upper portion of the substrate; and a protective layer disposed on the metal mesh, wherein a bending is formed at a boundary between the panel and the front frame, wherein the protective layer and the substrate are more transparent than the metal mesh, wherein a size of the second area is greater than a size of the first area, wherein a width of the opaque metal electrode is the same as a width of the metal mesh, wherein the opaque metal electrode is disposed in the area corresponding to the front frame, and the metal mesh is disposed in the area corresponding to the panel of the display, and wherein the protective layer is further disposed on a part of the opaque metal electrode and a boundary area in which the opaque metal electrode and the metal mesh are contacted.

2. The image display apparatus of claim 1, wherein one end of the opaque metal electrode is connected to a signal feed line having a narrower width than the width of the opaque metal electrode.

3. The image display apparatus of claim 1, wherein a first metal mesh having a first width is formed in the second area of the upper portion of the substrate, a second metal mesh having a second narrower width than the first width is formed on a third area of the upper portion of the substrate, and wherein the protective layer is disposed on a portion of the first area, the second area, and an upper portion of the third area.

4. The image display apparatus of claim 3, wherein the width of the opaque metal electrode is the same as the first width of the first metal mesh, and wherein one end of the opaque metal electrode is connected to a signal feed line having a narrower width than the width of the opaque metal electrode.

5. The image display apparatus of claim 1, wherein the protective layer comprises:

an adhesive layer; and a flexible polymer film disposed on the adhesive layer.

6. The image display apparatus of claim 5, wherein the flexible polymer film includes at least one of ester film, polyester resin, polyolefin resin, acrylic resin, styrene resin, cellulose resin, triacetyl cellulose, imide resin, or polycarbonate resin.

7. The image display apparatus of claim 5, wherein the adhesive layer includes at least one of Optically Clear Adhesive (OCA) or Optically Clear Resin (OCR).

8. The image display apparatus of claim 1, wherein the protective layer includes flexible polymer resin.

9. The image display apparatus of claim 8, wherein the flexible polymer resin includes at least one of polyester resin, polyolefin resin, acrylic resin, styrene resin, cellulose resin, triacetyl cellulose, imide resin, polycarbonate resin, curing initiator, or viscosity modifier.

10. The image display apparatus of claim 1, wherein the protective layer includes an optically clear adhesive (OCA) and a polyethlene terephthalate (PET) film disposed on the optically clear adhesive, wherein a thickness of the optically clear adhesive ranges from 15 to 50 micrometers (μm), and wherein a thickness of the PET film ranges from 12 to 25 μm.

11. The image display apparatus of claim 1, wherein the substrate includes at least one of a polyethlene terephthalate (PET) film, Cyclo Olefin Polymer, or colorless polyimide.

12. The image display apparatus of claim 1, wherein the metal mesh includes copper.

13. The image display apparatus of claim 1, wherein the substrate comprises a transparent flexible substrate.

14. The image display apparatus of claim 1, wherein the protective layer includes a lower dielectric constant and a lower dielectric loss than the substrate.

15. The image display apparatus of claim 1, further comprising:

a flexible printed circuit board; and a joining member connecting the flexible printed circuit board and the opaque metal electrode, wherein a portion of the metal mesh is connected to a different portion of the opaque metal electrode than the joining member.

16. An image display apparatus comprising:

a display;

a wireless transmission device separated from the display and configured to transmit video data to the display through a wireless communication scheme; and at least one antenna apparatus including:

a first part of the at least one antenna apparatus that is disposed on an area corresponding to a front frame around a panel of the display;

a second part of the at least one antenna device that is disposed in an area corresponding to a rear frame in a lower portion of the panel;

a substrate;

an opaque metal electrode disposed in a first area on an upper portion of the substrate;

a metal mesh disposed in a second area on the upper portion of the substrate; and a protective layer disposed on the metal mesh, wherein a bending is formed at a boundary between the front frame and the rear frame, wherein the protective layer and the substrate are more transparent than the metal mesh, wherein a size of the second area is greater than a size of the first area, wherein a width of the opaque metal electrode is the same as a width of the metal mesh, wherein the opaque metal electrode is disposed in the area corresponding to the front frame, and the metal mesh is disposed in the area corresponding to the rear frame, and wherein the protective layer is further disposed on a part of the opaque metal electrode and a boundary area in which the opaque metal electrode and the metal mesh are contacted.

17. The image display apparatus of claim 16, wherein a first metal mesh having a first width is formed in the second area of the upper portion of the substrate, a second metal mesh having a second width narrower than the first width is formed on a third area of the upper portion of the substrate, and wherein the protective layer is formed on a portion of the first area, the second area, and an upper portion of the third area.

18. The image display apparatus of claim 16, wherein the protective layer includes:

an adhesive layer; and a flexible polymer film disposed on the adhesive layer.

19. The image display apparatus of claim 16, wherein the protective layer includes an optically clear adhesive (OCA) and a polyethlene terephthalate (PET) film disposed on the optically clear adhesive, wherein a thickness of the optically clear adhesive ranges from approximately 15 to 50 micrometers (μm), and wherein a thickness of the PET film ranges from approximately 12 to 25 μm.

* * * * *